(12) United States Patent
Shahparnia et al.

(10) Patent No.: US 10,488,992 B2
(45) Date of Patent: Nov. 26, 2019

(54) MULTI-CHIP TOUCH ARCHITECTURE FOR SCALABILITY

(71) Applicant: Apple Inc., Cupertino, CA (US)

(72) Inventors: Shahrooz Shahparnia, Monte Sereno, CA (US); Vivek Pant, San Jose, CA (US); Christoph H. Krah, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 165 days.

(21) Appl. No.: 14/993,017

(22) Filed: Jan. 11, 2016

(65) Prior Publication Data

US 2016/0266679 A1    Sep. 15, 2016

Related U.S. Application Data

(60) Provisional application No. 62/131,242, filed on Mar. 10, 2015.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ... G06F 3/044; G06F 3/0416; G06F 17/30575
See application file for complete search history.

(56) References Cited

U.S. PATENT DOCUMENTS

| 4,087,625 A | 5/1978 | Dym et al. |
| 4,090,092 A | 5/1978 | Serrano |

(Continued)

FOREIGN PATENT DOCUMENTS

| CN | 1246638 A | 3/2000 |
| CN | 1527274 A | 9/2004 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Abbas I Abdulselam
(74) *Attorney, Agent, or Firm* — Kubota & Basol LLP

(57) ABSTRACT

A multi-chip touch architecture for scalability can include one or more touch controller application specific integrated circuits (ASICs), and one or more switching circuits coupled between the one or more touch controller ASICs and the touch sensor panel. The number of touch controller ASICs and switching circuits can be scaled based on the size of the touch sensor panel. The touch controller ASICs can include an interface for data transfer between the touch controller ASICs to allow for parallel processing of an image of touch by more than one touch controller ASIC. The touch controller ASIC can also include a memory directly accessible by more than one processing circuit (e.g., hardware accelerators), and circuitry to dynamically adjust the coupling between portions (e.g., banks) of memory and inputs of the one or more processing circuits to minimize data transfer and improve processing speeds.

24 Claims, 20 Drawing Sheets

(56) References Cited

U.S. PATENT DOCUMENTS

| | | |
|---|---|---|
| 4,304,976 A | 12/1981 | Gottbreht et al. |
| 4,475,235 A | 10/1984 | Graham |
| 4,550,221 A | 10/1985 | Mabusth |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,631,670 A | 5/1997 | Tomiyoshi et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 5,914,465 A | 6/1999 | Allen et al. |
| 6,057,903 A | 5/2000 | Colgan et al. |
| 6,137,427 A | 10/2000 | Binstead |
| 6,163,313 A | 12/2000 | Aroyan et al. |
| 6,188,391 B1 | 2/2001 | Seely et al. |
| 6,239,788 B1 | 5/2001 | Nohno et al. |
| 6,310,610 B1 | 10/2001 | Beaton et al. |
| 6,323,846 B1 | 11/2001 | Westerman et al. |
| 6,452,514 B1 | 9/2002 | Philipp |
| 6,456,952 B1 | 9/2002 | Nathan |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,180,508 B2 | 2/2007 | Kent et al. |
| 7,184,064 B2 | 2/2007 | Zimmerman et al. |
| 7,337,085 B2 | 2/2008 | Soss |
| 7,395,717 B2 | 7/2008 | DeAngelis et al. |
| 7,412,586 B1 | 8/2008 | Rajopadhye et al. |
| 7,504,833 B1 | 3/2009 | Sequine |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,719,523 B2 | 5/2010 | Hillis |
| 7,701,539 B2 | 8/2010 | Shih et al. |
| 7,907,126 B2 | 3/2011 | Yoon et al. |
| 7,932,898 B2 | 4/2011 | Philipp et al. |
| 8,026,904 B2 | 9/2011 | Westerman |
| 8,040,321 B2 | 10/2011 | Peng et al. |
| 8,040,326 B2 | 10/2011 | Hotelling et al. |
| 8,045,783 B2 | 10/2011 | Lee et al. |
| 8,058,884 B2 | 11/2011 | Betancourt |
| 8,068,097 B2 | 11/2011 | GuangHai |
| 8,120,371 B2 | 2/2012 | Day et al. |
| 8,125,312 B2 | 2/2012 | Orr |
| 8,169,421 B2 | 5/2012 | Wright et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,339,286 B2 | 12/2012 | Cordeiro |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,507,811 B2 | 8/2013 | Hotelling et al. |
| 8,508,495 B2 | 8/2013 | Hotelling et al. |
| 8,537,126 B2 | 9/2013 | Yousefpor et al. |
| 8,542,208 B2 | 9/2013 | Krah et al. |
| 8,593,410 B2 | 11/2013 | Hong et al. |
| 8,593,425 B2 | 11/2013 | Hong et al. |
| 8,614,688 B2 | 12/2013 | Chang |
| 8,680,877 B2 | 3/2014 | Lee et al. |
| 8,760,412 B2 | 6/2014 | Hotelling et al. |
| 8,773,146 B1 | 7/2014 | Hills et al. |
| 8,810,543 B1 | 8/2014 | Kurikawa |
| 8,884,917 B2 | 11/2014 | Seo |
| 8,902,172 B2 | 12/2014 | Peng et al. |
| 8,922,521 B2 | 12/2014 | Hotelling et al. |
| 8,957,874 B2 | 2/2015 | Elias |
| 8,976,133 B2 | 3/2015 | Yao et al. |
| 8,982,096 B2 | 3/2015 | Hong et al. |
| 8,982,097 B1 | 3/2015 | Kuzo |
| 9,001,082 B1 | 4/2015 | Rosenberg et al. |
| 9,035,895 B2 | 5/2015 | Bussat et al. |
| 9,075,463 B2 | 7/2015 | Pyo et al. |
| 9,086,774 B2 | 7/2015 | Hotelling et al. |
| 9,189,119 B2 | 11/2015 | Liao |
| 9,261,997 B2 | 2/2016 | Chang et al. |
| 9,292,137 B2 | 3/2016 | Kogo |
| 9,329,674 B2 | 5/2016 | Lee et al. |
| 9,329,723 B2 | 5/2016 | Benbasat et al. |
| 9,372,576 B2 | 6/2016 | Westerman |
| 9,582,131 B2 | 2/2017 | Elias |
| 9,690,397 B2 | 6/2017 | Shepelev et al. |
| 9,785,295 B2 | 10/2017 | Yang |
| 9,804,717 B2 | 10/2017 | Schropp, Jr. |
| 9,874,975 B2 | 1/2018 | Benbasat et al. |
| 9,880,655 B2 | 1/2018 | O'Connor |
| 9,886,141 B2 | 2/2018 | Yousefpor |
| 9,904,427 B1 | 2/2018 | Co |
| 9,996,175 B2 | 6/2018 | Hotelling et al. |
| 10,001,888 B2 | 6/2018 | Hong |
| 10,061,433 B2 | 8/2018 | Imai |
| 10,289,251 B2 | 5/2019 | Shih et al. |
| 2002/0152048 A1 | 10/2002 | Hayes |
| 2003/0076325 A1 | 4/2003 | Thrasher |
| 2003/0164820 A1 | 9/2003 | Kent |
| 2003/0210235 A1 | 11/2003 | Roberts |
| 2004/0017362 A1 | 1/2004 | Mulligan et al. |
| 2004/0061687 A1 | 4/2004 | Kent et al. |
| 2004/0090429 A1 | 5/2004 | Geaghan et al. |
| 2004/0188151 A1 | 9/2004 | Gerpheide et al. |
| 2004/0239650 A1 | 12/2004 | Mackey |
| 2005/0007353 A1 | 1/2005 | Smith et al. |
| 2005/0012724 A1 | 1/2005 | Kent |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0239532 A1 | 10/2005 | Inamura |
| 2005/0270039 A1 | 12/2005 | Mackey |
| 2005/0270273 A1 | 12/2005 | Marten |
| 2005/0280639 A1 | 12/2005 | Taylor et al. |
| 2006/0001640 A1 | 1/2006 | Lee |
| 2006/0017710 A1 | 1/2006 | Lee et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0202969 A1 | 9/2006 | Hauck |
| 2006/0238522 A1 | 10/2006 | Westerman et al. |
| 2006/0267953 A1 | 11/2006 | Peterson et al. |
| 2006/0278444 A1 | 12/2006 | Binstead |
| 2006/0279548 A1 | 12/2006 | Geaghan |
| 2006/0293864 A1 | 12/2006 | Soss |
| 2007/0008299 A1 | 1/2007 | Hristov |
| 2007/0012665 A1 | 1/2007 | Nelson et al. |
| 2007/0023523 A1 | 2/2007 | Onishi |
| 2007/0074914 A1 | 4/2007 | Geaghan et al. |
| 2007/0075982 A1 | 4/2007 | Morrison et al. |
| 2007/0216637 A1 | 9/2007 | Ito |
| 2007/0216657 A1 | 9/2007 | Konicek |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0262969 A1 | 11/2007 | Pak |
| 2007/0268273 A1 | 11/2007 | Westerman et al. |
| 2007/0268275 A1 | 11/2007 | Westerman et al. |
| 2007/0279395 A1 | 12/2007 | Philipp |
| 2007/0283832 A1 | 12/2007 | Hotelling |

(56) References Cited

U.S. PATENT DOCUMENTS

| | | |
|---|---|---|
| 2007/0285365 A1 | 12/2007 | Lee |
| 2008/0006454 A1 | 1/2008 | Hotelling |
| 2008/0007533 A1 | 1/2008 | Hotelling |
| 2008/0018581 A1 | 1/2008 | Park et al. |
| 2008/0024456 A1 | 1/2008 | Peng et al. |
| 2008/0036742 A1 | 2/2008 | Garmon |
| 2008/0042986 A1 | 2/2008 | Westerman et al. |
| 2008/0042987 A1 | 2/2008 | Westerman et al. |
| 2008/0042992 A1 | 2/2008 | Kim |
| 2008/0047764 A1 | 2/2008 | Lee et al. |
| 2008/0062140 A1 | 3/2008 | Hotelling et al. |
| 2008/0062148 A1 | 3/2008 | Hotelling et al. |
| 2008/0062151 A1 | 3/2008 | Kent |
| 2008/0074398 A1 | 3/2008 | Wright |
| 2008/0136787 A1 | 6/2008 | Yeh et al. |
| 2008/0136792 A1 | 6/2008 | Peng et al. |
| 2008/0158145 A1 | 7/2008 | Westerman |
| 2008/0158146 A1 | 7/2008 | Westerman |
| 2008/0158167 A1 | 7/2008 | Hotelling et al. |
| 2008/0158172 A1 | 7/2008 | Hotelling et al. |
| 2008/0158174 A1 | 7/2008 | Land et al. |
| 2008/0158181 A1 | 7/2008 | Hamblin et al. |
| 2008/0158182 A1 | 7/2008 | Westerman |
| 2008/0158185 A1 | 7/2008 | Westerman |
| 2008/0162996 A1 | 7/2008 | Krah et al. |
| 2008/0188267 A1 | 8/2008 | Sagong |
| 2008/0224962 A1 | 9/2008 | Kasai et al. |
| 2008/0238871 A1 | 10/2008 | Tam |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0303964 A1 | 12/2008 | Lee et al. |
| 2008/0309626 A1 | 12/2008 | Westerman et al. |
| 2008/0309627 A1 | 12/2008 | Hotelling et al. |
| 2008/0309629 A1 | 12/2008 | Westerman et al. |
| 2008/0309632 A1 | 12/2008 | Westerman et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0020343 A1 | 1/2009 | Rothkopf et al. |
| 2009/0070681 A1* | 3/2009 | Dawes ............... G06F 17/30873 715/736 |
| 2009/0073138 A1 | 3/2009 | Lee et al. |
| 2009/0085894 A1 | 4/2009 | Gandhi et al. |
| 2009/0091551 A1 | 4/2009 | Hotelling et al. |
| 2009/0114456 A1 | 5/2009 | Wisniewski |
| 2009/0128516 A1 | 5/2009 | Rimon et al. |
| 2009/0135157 A1 | 5/2009 | Harley |
| 2009/0160787 A1 | 6/2009 | Westerman et al. |
| 2009/0174676 A1 | 7/2009 | Westerman |
| 2009/0174688 A1 | 7/2009 | Westerman |
| 2009/0182189 A1 | 7/2009 | Lira |
| 2009/0184937 A1 | 7/2009 | Grivna |
| 2009/0194344 A1 | 8/2009 | Harley et al. |
| 2009/0205879 A1 | 8/2009 | Halsey, IV et al. |
| 2009/0213090 A1 | 8/2009 | Mamba et al. |
| 2009/0236151 A1 | 9/2009 | Yeh et al. |
| 2009/0242283 A1 | 10/2009 | Chiu |
| 2009/0251427 A1 | 10/2009 | Hung et al. |
| 2009/0267902 A1 | 10/2009 | Nambu et al. |
| 2009/0267903 A1 | 10/2009 | Cady et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0006350 A1 | 1/2010 | Elias |
| 2010/0007616 A1 | 1/2010 | Jang |
| 2010/0039396 A1 | 2/2010 | Ho et al. |
| 2010/0059294 A1 | 3/2010 | Elias et al. |
| 2010/0060608 A1 | 3/2010 | Yousefpor |
| 2010/0079384 A1 | 4/2010 | Grivna |
| 2010/0079401 A1 | 4/2010 | Staton |
| 2010/0102027 A1 | 4/2010 | Liu et al. |
| 2010/0110035 A1 | 5/2010 | Selker |
| 2010/0117985 A1 | 5/2010 | Wadia |
| 2010/0143848 A1 | 6/2010 | Jain et al. |
| 2010/0156810 A1 | 6/2010 | Barbier et al. |
| 2010/0156846 A1 | 6/2010 | Long et al. |
| 2010/0182278 A1 | 7/2010 | Li et al. |
| 2010/0194697 A1 | 8/2010 | Hotelling et al. |
| 2010/0194707 A1 | 8/2010 | Hotelling et al. |
| 2010/0245286 A1 | 9/2010 | Parker |
| 2010/0253638 A1 | 10/2010 | Yousefpor et al. |
| 2010/0328248 A1 | 12/2010 | Mozdzyn |
| 2010/0328263 A1 | 12/2010 | Lin |
| 2011/0007020 A1 | 1/2011 | Hong |
| 2011/0025623 A1 | 2/2011 | Lin |
| 2011/0025629 A1 | 2/2011 | Grivna et al. |
| 2011/0025635 A1 | 2/2011 | Lee |
| 2011/0096016 A1 | 4/2011 | Yilmaz |
| 2011/0134050 A1 | 6/2011 | Harley |
| 2011/0157068 A1 | 6/2011 | Parker |
| 2011/0199105 A1 | 8/2011 | Otagaki et al. |
| 2011/0227874 A1 | 9/2011 | Faahraeus et al. |
| 2011/0231139 A1 | 9/2011 | Yokota |
| 2011/0241907 A1 | 10/2011 | Cordeiro |
| 2011/0248949 A1 | 10/2011 | Chang et al. |
| 2011/0254795 A1 | 10/2011 | Chen |
| 2011/0261005 A1 | 10/2011 | Joharapurkar et al. |
| 2011/0261007 A1 | 10/2011 | Joharapurkar et al. |
| 2011/0282606 A1 | 11/2011 | Ahed et al. |
| 2011/0298727 A1 | 12/2011 | Yousefpor et al. |
| 2011/0310033 A1 | 12/2011 | Liu et al. |
| 2011/0310064 A1 | 12/2011 | Keski-Jaskari et al. |
| 2012/0026029 A1 | 2/2012 | Harley |
| 2012/0044199 A1 | 2/2012 | Karpin et al. |
| 2012/0050206 A1* | 3/2012 | Welland ............... G06F 3/0416 345/174 |
| 2012/0050214 A1 | 3/2012 | Kremin |
| 2012/0050216 A1 | 3/2012 | Kremin et al. |
| 2012/0054379 A1* | 3/2012 | Leung ................. G06F 1/3206 710/23 |
| 2012/0056662 A1 | 3/2012 | Wilson et al. |
| 2012/0056851 A1 | 3/2012 | Chen et al. |
| 2012/0075239 A1 | 3/2012 | Azumi et al. |
| 2012/0092288 A1 | 4/2012 | Wadia |
| 2012/0098776 A1 | 4/2012 | Chen et al. |
| 2012/0113047 A1 | 5/2012 | Hanauer et al. |
| 2012/0146726 A1 | 6/2012 | Huang |
| 2012/0146942 A1 | 6/2012 | Kamoshida et al. |
| 2012/0154324 A1 | 6/2012 | Wright et al. |
| 2012/0162133 A1 | 6/2012 | Chen et al. |
| 2012/0162134 A1 | 6/2012 | Chen et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2012/0169664 A1 | 7/2012 | Milne |
| 2012/0182251 A1 | 7/2012 | Krah |
| 2012/0211264 A1 | 8/2012 | Milne |
| 2012/0262395 A1 | 10/2012 | Chan |
| 2012/0313881 A1 | 12/2012 | Ge et al. |
| 2012/0320385 A1* | 12/2012 | Mu ..................... G01B 11/002 356/624 |
| 2013/0015868 A1 | 1/2013 | Peng |
| 2013/0021291 A1 | 1/2013 | Kremin et al. |
| 2013/0027118 A1 | 1/2013 | Ho et al. |
| 2013/0027346 A1 | 1/2013 | Yarosh et al. |
| 2013/0038573 A1 | 2/2013 | Chang |
| 2013/0057511 A1 | 3/2013 | Shepelev et al. |
| 2013/0069911 A1 | 3/2013 | You |
| 2013/0076648 A1 | 3/2013 | Krah et al. |
| 2013/0100071 A1 | 4/2013 | Wright |
| 2013/0120303 A1 | 5/2013 | Hong et al. |
| 2013/0127739 A1 | 5/2013 | Guard et al. |
| 2013/0141383 A1 | 6/2013 | Woolley |
| 2013/0154996 A1 | 6/2013 | Trend et al. |
| 2013/0173211 A1 | 7/2013 | Hoch et al. |
| 2013/0176271 A1 | 7/2013 | Sobel et al. |
| 2013/0176273 A1 | 7/2013 | Li et al. |

(56) References Cited

U.S. PATENT DOCUMENTS

| | | |
|---|---|---|
| 2013/0215049 A1 | 8/2013 | Lee |
| 2013/0234964 A1* | 9/2013 | Kim .................... G06F 3/041 |
| | | 345/173 |
| 2013/0257785 A1 | 10/2013 | Brown et al. |
| 2013/0257797 A1 | 10/2013 | Wu et al. |
| 2013/0265276 A1 | 10/2013 | Obeidat et al. |
| 2013/0271427 A1 | 10/2013 | Benbasat |
| 2013/0278447 A1 | 10/2013 | Kremin |
| 2013/0278498 A1 | 10/2013 | Jung et al. |
| 2013/0278525 A1 | 10/2013 | Lim et al. |
| 2013/0278543 A1 | 10/2013 | Hsu |
| 2013/0314342 A1 | 11/2013 | Kim |
| 2013/0320994 A1 | 12/2013 | Brittain |
| 2013/0321289 A1 | 12/2013 | Dubery et al. |
| 2013/0342479 A1 | 12/2013 | Pyo et al. |
| 2014/0002406 A1 | 1/2014 | Cormier et al. |
| 2014/0009438 A1 | 1/2014 | Liu et al. |
| 2014/0022201 A1 | 1/2014 | Boychuk |
| 2014/0043546 A1 | 2/2014 | Yamazaki et al. |
| 2014/0071084 A1 | 3/2014 | Sugiura |
| 2014/0078096 A1 | 3/2014 | Tan et al. |
| 2014/0104225 A1 | 4/2014 | Davidson et al. |
| 2014/0104228 A1 | 4/2014 | Chen et al. |
| 2014/0118270 A1* | 5/2014 | Moses .................... G06F 3/041 |
| | | 345/173 |
| 2014/0125628 A1 | 5/2014 | Yoshida et al. |
| 2014/0132560 A1 | 5/2014 | Huang et al. |
| 2014/0145997 A1 | 5/2014 | Tiruvuru |
| 2014/0152615 A1 | 6/2014 | Chang et al. |
| 2014/0160058 A1 | 6/2014 | Chen et al. |
| 2014/0168540 A1 | 6/2014 | Wang et al. |
| 2014/0204058 A1 | 7/2014 | Huang |
| 2014/0240291 A1 | 8/2014 | Nam |
| 2014/0247245 A1 | 9/2014 | Lee |
| 2014/0253470 A1* | 9/2014 | Havilio ................ G06F 3/0412 |
| | | 345/173 |
| 2014/0267070 A1 | 9/2014 | Shahparnia et al. |
| 2014/0267146 A1 | 9/2014 | Chang et al. |
| 2014/0285469 A1 | 9/2014 | Wright et al. |
| 2014/0306924 A1 | 10/2014 | Lin |
| 2014/0347574 A1 | 11/2014 | Tung et al. |
| 2014/0362034 A1 | 12/2014 | Mo et al. |
| 2014/0368436 A1 | 12/2014 | Abzarian et al. |
| 2014/0368460 A1 | 12/2014 | Mo et al. |
| 2014/0375598 A1 | 12/2014 | Shen et al. |
| 2014/0375603 A1 | 12/2014 | Hotelling et al. |
| 2014/0375903 A1 | 12/2014 | Westhues et al. |
| 2015/0002176 A1 | 1/2015 | Kwon et al. |
| 2015/0002448 A1 | 1/2015 | Brunet et al. |
| 2015/0002464 A1 | 1/2015 | Nishioka et al. |
| 2015/0009009 A1 | 1/2015 | Choi |
| 2015/0015528 A1 | 1/2015 | Vandermeijden |
| 2015/0026398 A1* | 1/2015 | Kim .................... G06F 13/102 |
| | | 711/105 |
| 2015/0042600 A1 | 2/2015 | Lukanc et al. |
| 2015/0042607 A1 | 2/2015 | Takanohashi |
| 2015/0049043 A1 | 2/2015 | Yousefpor |
| 2015/0049044 A1 | 2/2015 | Yousefpor |
| 2015/0077375 A1 | 3/2015 | Hotelling et al. |
| 2015/0091587 A1 | 4/2015 | Shepelev et al. |
| 2015/0091849 A1 | 4/2015 | Ludden |
| 2015/0103047 A1 | 4/2015 | Hanauer et al. |
| 2015/0116263 A1 | 4/2015 | Kim |
| 2015/0123939 A1 | 5/2015 | Kim et al. |
| 2015/0227240 A1 | 8/2015 | Hong et al. |
| 2015/0242028 A1 | 8/2015 | Roberts et al. |
| 2015/0248177 A1 | 9/2015 | Maharyta |
| 2015/0253907 A1 | 9/2015 | Elias |
| 2015/0268789 A1* | 9/2015 | Liao .................... G06F 3/0416 |
| | | 345/173 |
| 2015/0268795 A1 | 9/2015 | Kurasawa et al. |
| 2015/0309610 A1 | 10/2015 | Rabii et al. |
| 2015/0338937 A1 | 11/2015 | Shepelev et al. |
| 2015/0370387 A1 | 12/2015 | Yamaguchi et al. |
| 2015/0378465 A1 | 12/2015 | Shih et al. |
| 2016/0018348 A1 | 1/2016 | Yau et al. |
| 2016/0041629 A1* | 2/2016 | Rao ...................... G06F 3/038 |
| | | 348/734 |
| 2016/0048234 A1 | 2/2016 | Chandran |
| 2016/0062533 A1 | 3/2016 | O'Connor |
| 2016/0077667 A1 | 3/2016 | Chiang |
| 2016/0139728 A1 | 5/2016 | Jeon et al. |
| 2016/0154505 A1 | 6/2016 | Chang et al. |
| 2016/0154529 A1 | 6/2016 | Westerman |
| 2016/0224177 A1 | 8/2016 | Krah |
| 2016/0224189 A1 | 8/2016 | Yousefpor et al. |
| 2016/0246423 A1 | 8/2016 | Fu |
| 2016/0253041 A1 | 9/2016 | Park |
| 2016/0259448 A1 | 9/2016 | Guarneri |
| 2016/0266676 A1 | 9/2016 | Wang et al. |
| 2016/0282980 A1 | 9/2016 | Chintalapoodi |
| 2016/0283023 A1 | 9/2016 | Shin et al. |
| 2016/0299603 A1 | 10/2016 | Tsujioka et al. |
| 2016/0357344 A1 | 12/2016 | Benbasat et al. |
| 2017/0090619 A1 | 3/2017 | Yousefpor |
| 2017/0097703 A1 | 4/2017 | Lee |
| 2017/0139539 A1 | 5/2017 | Yao et al. |
| 2017/0168626 A1* | 6/2017 | Konicek .............. G06F 3/0412 |
| 2017/0229502 A1 | 8/2017 | Liu |
| 2017/0269729 A1 | 9/2017 | Chintalapoodi |
| 2017/0285804 A1 | 10/2017 | Yingxuan et al. |
| 2017/0357371 A1 | 12/2017 | Kim |
| 2018/0067584 A1 | 3/2018 | Zhu et al. |
| 2018/0275824 A1 | 9/2018 | Li et al. |
| 2018/0307374 A1 | 10/2018 | Shah et al. |
| 2018/0307375 A1 | 10/2018 | Shah et al. |
| 2019/0034032 A1 | 1/2019 | Westerman |

FOREIGN PATENT DOCUMENTS

| | | |
|---|---|---|
| CN | 1672119 A | 9/2005 |
| CN | 1689677 A | 11/2005 |
| CN | 1711520 A | 12/2005 |
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| CN | 101419516 A | 4/2009 |
| CN | 102023768 A | 4/2011 |
| CN | 103049148 A | 4/2013 |
| CN | 103221910 A | 7/2013 |
| CN | 103294321 A | 9/2013 |
| CN | 103365506 A | 10/2013 |
| CN | 103809810 A | 5/2014 |
| CN | 104020908 A | 9/2014 |
| CN | 105474154 A | 4/2016 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 455 264 A2 | 9/2004 |
| EP | 1 455 264 A3 | 9/2004 |
| EP | 1 644 918 A2 | 12/2004 |
| EP | 1 717 677 A2 | 11/2006 |
| EP | 1 717 677 A3 | 11/2006 |
| EP | 1 986 084 A1 | 10/2008 |
| EP | 2 077 489 A1 | 7/2009 |
| EP | 2 256 606 A2 | 12/2010 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2005-301373 A | 10/2005 |
| JP | 2007-018515 A | 1/2007 |

(56) References Cited

FOREIGN PATENT DOCUMENTS

| | | |
|---|---|---|
| JP | 2008-510251 A | 4/2008 |
| JP | 2008-225415 A | 9/2008 |
| KR | 10-20040091728 A | 10/2004 |
| KR | 10-20070002327 A | 1/2007 |
| KR | 10-2008-0019125 A | 3/2008 |
| KR | 10-2013-0094495 A | 8/2013 |
| KR | 10-2013-0117499 A | 10/2013 |
| KR | 10-2014-0074454 A | 6/2014 |
| KR | 10-1609992 B1 | 4/2016 |
| TW | 200715015 A | 4/2007 |
| TW | 200826032 A | 6/2008 |
| TW | 2008-35294 A | 8/2008 |
| TW | M341273 U | 9/2008 |
| TW | M344522 | 11/2008 |
| TW | M344544 | 11/2008 |
| TW | 201115442-1 | 5/2011 |
| TW | 201401129 A | 1/2014 |
| TW | 201419071 A | 5/2014 |
| WO | WO-99/35633 A2 | 7/1999 |
| WO | WO-99/35633 A3 | 7/1999 |
| WO | WO-01/097204 A1 | 12/2001 |
| WO | WO-2005/114369 A2 | 12/2005 |
| WO | WO-2005/114369 A3 | 12/2005 |
| WO | WO-2006/020305 A2 | 2/2006 |
| WO | WO-2006/020305 A3 | 2/2006 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/066488 A1 | 6/2007 |
| WO | WO-2007/089766 A2 | 8/2007 |
| WO | WO-2007/089766 A3 | 8/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/047990 A1 | 4/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/088659 A1 | 8/2010 |
| WO | WO-2010/117882 A2 | 10/2010 |
| WO | WO-2011/137200 A1 | 11/2011 |
| WO | WO-2013/158570 A1 | 10/2013 |
| WO | WO-2014/12771 A1 | 8/2014 |
| WO | WO-2015/017196 A1 | 2/2015 |
| WO | WO-2015/023410 A1 | 2/2015 |
| WO | WO-2015/072722 A1 | 5/2015 |
| WO | WO-2015/107969 A1 | 7/2015 |
| WO | WO-2015/178920 A1 | 11/2015 |
| WO | WO-2016/048269 A1 | 3/2016 |
| WO | WO-2016/069642 A1 | 5/2016 |
| WO | WO-2016/126525 A1 | 8/2016 |
| WO | WO-2017/058415 A2 | 4/2017 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Final Office Action dated Apr. 8, 2016, for U.S. Appl. No. 13/899,391, filed May 21, 2013, ten pages.
Final Office Action dated May 9, 2016, for U.S. Appl. No. 14/318,157, filed Jun. 27, 2014, ten pages.
Final Office Action dated May 27, 2016, for U.S. Appl. No. 14/645,120, filed Mar. 11, 2015, twelve pages.
Final Office Action dated Jun. 14, 2016, for U.S. Appl. No. 14/550,686, filed Nov. 21, 2014, ten pages.
International Search Report dated May 9, 2016, for PCT Application No. PCT/US2016/015479, filed Jan. 28, 2016, five pages.
International Search Report dated May 11, 2016, for PCT Application No. PCT/US2016/016011, filed Feb. 1, 2016, six pages.
Non-Final Office Action dated Apr. 14, 2016, for U.S. Appl. No. 14/558,529, filed Dec. 2, 2014, 20 pages.
Non-Final Office Action dated May 25, 2016, for U.S. Appl. No. 14/082,003, filed Nov. 15, 2013, 23 pages.
Non-Final Office Action dated Jun. 1, 2016, for U.S. Appl. No. 14/615,186, filed Feb. 5, 2015, eight pages.
TW Search Report dated May 3, 2016, for TW Application No. 104115152, one page.
Final Office Action dated Sep. 29, 2016, for U.S. Appl. No. 14/558,529, filed Dec. 2, 2014, 22 pages.
Final Office Action dated Nov. 4, 2016, for U.S. Appl. No. 14/082,003, filed Nov. 15, 2013, 18 pages.
Non-Final Office Action dated Dec. 14, 2016, for U.S. Appl. No. 14/550,686, filed Nov. 21, 2014, eight pages.
Notice of Allowance dated Dec. 2, 2016, for U.S. Appl. No. 14/615,186, filed Feb. 5, 2015, seven pages.
Non-Final Office Action dated Dec. 16, 2016, for U.S. Appl. No. 14/645,120, filed Mar. 11, 2015, ten pages.
Non-Final Office Action dated Dec. 19, 2016, for U.S. Appl. No. 14/318,157, filed Jun. 27, 2014, eleven pages.
Non-Final Office Action dated Mar. 13, 2017, for U.S. Appl. No. 14/082,003, filed Nov. 15, 2013, 20 pages.
Non-Final Office Action dated Apr. 7, 2017, for U.S. Appl. No. 15/144,706, filed May 2, 2016, eight pages.
European Search Report dated Jul. 27, 2017, for EP Application No. 14902458.0, four pages.
Final Office Action dated Jul. 26, 2017, for U.S. Appl. No. 14/318,157, filed Jun. 27, 2014, 10 pages.
Final Office Action dated Aug. 10, 2017, for U.S. Appl. No. 14/645,120, filed Mar. 11, 2015, twelve pages.
Final Office Action dated Aug. 21, 2017, for U.S. Appl. No. 14/550,686, filed Nov. 21, 2014, 11 pages.
Non-Final Office Action dated Jun. 14, 2017, for U.S. Appl. No. 15/006,987, filed Jan. 26, 2016, 14 pages.
Non-Final Office Action dated Jun. 26, 2017, for U.S. Appl. No. 14/558,529, filed Dec. 2, 2014, six pages.
Non-Final Office Action dated Sep. 14, 2017 , for U.S. Appl. No. 15/017,463, filed Feb. 5, 2016, 22 pages.
Notice of Allowance dated Sep. 20, 2017, for U.S. Appl. No. 14/082,003, filed Nov. 15, 2013, eight pages.
Notice of Allowance dated Sep. 20, 2017, for U.S. Appl. No. 15/144,706, filed May 2, 2016, nine pages.
Notice of Allowance dated Oct. 3, 2017, for U.S. Appl. No. 14/082,003, filed Nov. 15, 2013, nine pages.
Notice of Allowance dated Oct. 13, 2017, for U.S. Appl. No. 14/558,529, filed Dec. 2, 2014, eight pages.
European Search Report dated Jan. 31, 2018, for EP Application No. 17183937.6, four pages.
Final Office Action dated Dec. 5, 2017, for U.S. Appl. No. 15/006,987, filed Jan. 26, 2016, 16 pages.
Final Office Action dated May 14, 2018, for U.S. Appl. No. 15/006,987, filed Jan. 26, 2016, 11 pages.
Final Office Action dated May 17, 2018, for U.S. Appl. No. 15/017,463, filed Feb. 5, 2016, 22 pages.
Non-Final Office Action dated Jan. 22, 2018 , for U.S. Appl. No. 15/097,179, filed Apr. 12, 2016, 11 pages.
Non-Final Office Action dated Apr. 3, 2018, for U.S. Appl. No. 14/318,157, filed Jun. 27, 2014, twelve pages.

(56) References Cited

OTHER PUBLICATIONS

Notice of Allowance dated Feb. 9, 2018, for U.S. Appl. No. 14/550,686, filed Nov. 21, 2014, eleven pages.
Notice of Allowance dated Mar. 1, 2018, for U.S. Appl. No. 14/645,120, filed Mar. 11, 2015, five pages.
Non-Final Office Action dated Jun. 20, 2018, for U.S. Appl. No. 15/009,774, filed Jan. 28, 2016, seventeen pages.
Final Office Action mailed Jul. 27, 2018, for US Patent Application No. 15/097,179, filed Apr. 12, 2016, 11 pp.
Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.
Chinese Search Report completed Dec. 14, 2011, for CN Patent Application No. ZL201020108330X, filed Feb. 2, 2010, with English Translation, 22 pages.
Chinese Search Report completed May 18, 2015, for CNPatent Application No. 201310042816.6, filed Feb. 2, 2010, two pages.
European Search Report dated Jul. 21, 2010, for EP Patent Application 10151969.2, six pages.
European Search Report dated Apr. 25, 2012, for EP Patent Application No. 08022505.5, 12 pages.
European Search Report dated Dec. 3, 2012, for EP Patent Application No. 12162177.5, seven pages.
European Search Report dated Feb. 13, 2013, for EP Patent Application No. 12192450.0, six pages.
European Search Report dated Aug. 31, 2015, for EP Application No. 15166813.4, eight pages.
Final Office Action dated Jan. 5, 2012, for U.S. Appl. No. 12/206,680, filed Sep. 8, 2008, 15 pages.
Final Office Action dated Jan. 3, 2013, for U.S. Appl. No. 11/818,498, filed Jun. 13, 2007, 17 pages.
Final Office Action dated Feb. 1, 2013, for U.S. Appl. No. 12/642,466, filed Dec. 18, 2009, nine pages.
Final Office Action dated Feb. 5, 2013, for U.S. Appl. No. 12/500,911, filed Jul. 10, 2009, 15 pages.
Final Office Action dated Apr. 30, 2013, for U.S. Appl. No. 12/494,173, filed Jun. 29, 2009, 7 pages.
Final Office Action dated May 22, 2013, for U.S. Appl. No. 12/206,680, filed Sep. 8, 2008, 16 pages.
Final Office Action dated Jun. 21, 2013, for U.S. Appl. No. 12/545,754, filed Aug. 21, 2009, 6 pages.
Final Office Action dated Jul. 19, 2013, for U.S. Appl. No. 12,545/604, filed Aug. 21, 2009, 17 pages.
Final Office Action dated Aug. 12, 2013, for U.S. Appl. No. 12/238,333, filed Sep. 25, 2008, 19 pages.
Final Office Action dated Aug. 13, 2013, for U.S. Appl. No. 12/238,342, filed Sep. 25, 2008, 14 pages.
Final Office Action dated Jan. 27, 2014, for U.S. Appl. No. 12/206,680, filed Sep. 8, 2008, 20 pages.
Final Office Action dated Apr. 23, 2014 for U.S. Appl. No. 12/847,987, filed Jul. 30, 2010, 16 pages.
Final Office Action dated May 9, 2014, for U.S. Appl. No. 12/642,466, filed Dec. 18, 2009, 13 pages.
Final Office Action dated Jul. 16, 2014, for U.S. Appl. No. 12/545,604, filed Aug. 21, 2009, 18 pages.
Final Office Action dated Oct. 22, 2014, for U.S. Appl. No. 12/238,342, filed Sep. 25, 2008, 16 pages.
Final Office Action dated Oct. 22, 2014, for U.S. Appl. No. 13/448,182, filed Apr. 16, 2012, 11 pages.
Final Office Action dated Apr. 22, 2015, for U.S. Appl. No. 12/238,333, filed Sep. 25, 2008, 23 pages.
Final Office Action dated Jun. 11, 2015, for U.S. Appl. No. 13/448,182, filed Apr. 16, 2012, 12 pages.
Final Office Action dated Nov. 12, 2015, for U.S. Appl. No. 14/082,074, filed Nov. 15, 2013, 22 pages.
Final Office Action dated Jan. 4, 2016, for U.S. Appl. No. 14/082,003, filed Nov. 15, 2013, 25 pages.
Final Office Action dated Jan. 29, 2016, for U.S. Appl. No. 12/642,466, filed Dec. 18, 2009, nine pages.

International Search Report dated Mar. 10, 2010, for PCT Application No. PCT/US2010/22868, filed Feb. 2, 2010, three pages.
International Search Report dated Jan. 14, 2011, for PCT Application No. PCT/US2010/029698, filed Apr. 1, 2010, 4 pages.
International Search Report dated May 2, 2011, for PCT Application No. PCT/US2010/058988, filed Dec. 3, 2010, five pages.
International Search Report dated Aug. 6, 2013, for PCT Application No. PCT/US2013/036662, filed Apr. 15, 2013, three pages.
International Search Report dated Sep. 24, 2014, for PCT Application No. PCT/US/2014/39245, three pages.
International Search Report dated Dec. 12, 2014, for PCT Application No. PCT/US2014/56795, two pages.
International Search Report dated Jan. 29, 2015, for PCT Application No. PCT/US2014/047888, filed Jul. 23, 2014, six pages.
International Search Report dated Jan. 8, 2016, for PCT Application No. PCT/US2015/057644, filed Oct. 27, 2015, four pages.
Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04*, ACM pp. 289-296.
Non-Final Office Action dated Jun. 9, 2011, for U.S. Appl. No. 12/206,680, filed Sep. 8, 2008, 13 pages.
Non-Final Office Action dated Mar. 9, 2012, for U.S. Appl. No. 12/238,342, filed Sep. 25, 2008, 26 pgs.
Non-Final Office Action dated May 3, 2012, for U.S. Appl. No. 12/238,333, filed Sep. 25, 2008, 22 pgs.
Non-Final Office Action dated May 25, 2012, for U.S. Appl. No. 11/818,498, filed Jun. 13, 2007, 16 pages.
Non-Final Office Action dated Jun. 7, 2012, for U.S. Appl. No. 12/500,911, filed Jul. 10, 2009, 16 pages.
Non-Final Office Action dated Aug. 28, 2012, for U.S. Appl. No. 12/642,466, filed Dec. 18, 2009, nine pages.
Non-Final Office Action dated Sep. 26, 2012, for U.S. Appl. No. 12/206,680, filed Sep. 8, 2008, 14 pages.
Non-Final Office Action dated Oct. 5, 2012, for U.S. Appl. No. 12/545,754, filed Aug. 21, 2009, 10 pages.
Non-Final Office Action dated Nov. 23, 2012, for U.S. Appl. No. 12/545,557, filed Aug. 21, 2009, 11 pages.
Non-Final Office Action dated Nov. 28, 2012, for U.S. Appl. No. 12/494,173, filed Jun. 29, 2009, six pages.
Non-Final Office Action dated Jan. 7, 2013, for U.S. Appl. No. 12/238,333, filed Sep. 25, 2008, 20 pgs.
Non-Final office Action dated Jan. 7, 2013, for U.S. Appl. No. 12/545,604, filed Aug. 21, 2009, 12 pages.
Non-Final Office Action dated Feb. 15, 2013, for U.S. Appl. No. 12/238,342, filed Sep. 25, 2008, 15 pages.
Non-Final Office Action dated Mar. 29, 2013 for U.S. Appl. No. 13/737,779, filed Jan. 9, 2013, nine pages.
Non-Final Office Action dated Sep. 6, 2013, for U.S. Appl. No. 12/847,987, filed Jul. 30, 2010, 15 pages.
Non-Final Office Action dated Sep. 10, 2013, for U.S. Appl. No. 12/545,754, filed Aug. 21, 2009, six pages.
Non-Final Office Action dated Sep. 30, 2013, for U.S. Appl. No. 12/206,680, filed Sep. 8, 2008, 18 pages.
Non-Final Office Action dated Nov. 8, 2013, for U.S. Appl. No. 12/642,466, filed Dec. 18, 2009, 12 pages.
Non-Final Office Action dated Dec. 19, 2013, for U.S. Appl. No. 12/545,604, filed Aug. 21, 2009, 17 pages.
Non-Final Office Action dated Jan. 2, 2014, for U.S. Appl. No. 12/545,754, filed Aug. 21, 2009, 11 pages.
Non-Final Office Action dated Jan. 3, 2014 , for U.S. Appl. No. 12/545,557, filed Aug. 21, 2009, 9 pages.
Non-Final Office Action dated Jan. 31, 2014, for U.S. Appl. No. 13/448,182, filed Apr. 16, 2012, 18 pages.
Non-Final Office Action dated Mar. 12, 2014, for U.S. Appl. No. 12/238,342, filed Sep. 25, 2008, 15 pages.
Non-Final Office Action dated Apr. 10, 2014, for U.S. Appl. No. 14/055,717, filed Oct. 16, 2013, 10 pages.
Non-Final Office Action dated Sep. 18, 2014, for U.S. Appl. No. 12/238,333, filed Sep. 25, 2008, 21 pages.
Non-Final Office Action dated Apr. 10, 2015, for U.S. Appl. No. 14/082,074, filed Nov. 15, 2013, 23 pages.

(56) References Cited

OTHER PUBLICATIONS

Non-Final Office Action dated May 4, 2015, for U.S. Appl. No. 12/642,466, filed Dec. 18, 2009, nine pages.
Non-Final Office Action dated May 8, 2015, for U.S. Appl. No. 14/082,003, filed Nov. 15, 2013, 25 pages.
Non-Final Office Action dated Aug. 20, 2015 , for U.S. Appl. No. 14/550,686, filed Nov. 21, 2014, ten pages.
Non-Final Office Action dated Oct. 5, 2015, for U.S. Appl. No. 13/899,391, filed May 21, 2013, ten pages.
Non-Final Office Action dated Oct. 6, 2015, for U.S. Appl. No. 14/318,157, filed Jun. 27, 2014, seven pages.
Non-Final Office Action dated Oct. 27, 2015, for U.S. Appl. No. 14/645,120, filed Mar. 11, 2015, eight pages.
Notice of Allowance dated Jun. 10, 2013, for U.S. Appl. No. 12/545,557, filed Aug. 21, 2009, 9 pages.
Notice of Allowance dated Aug. 19, 2013, for U.S. Appl. No. 12/500,911, filed Jul. 10, 2009, six pages.
Notice of Allowance dated Sep. 3, 2013, for U.S. Appl. No. 13/737,779, filed Jan. 9, 2013, 10 pages.
Notice of Allowance dated Apr. 11, 2014, for U.S. Appl. No. 12/545,557, filed Aug. 21, 2009, 9 pages.
Notice of Allowance dated Aug. 21, 2014, for U.S. Appl. No. 12/545,754, filed Aug. 21, 2009, 8 pages.
Notice of Allowance dated Oct. 15, 2014, for U.S. Appl. No. 12/494,173, filed Jun. 29, 2009, eight pages.
Notice of Allowance dated Nov. 7, 2014, for U.S. Appl. No. 14/055,717, filed Oct. 16, 2013, six pages.
Notice of Allowance dated Mar. 16, 2015, for U.S. Appl. No. 14/312,489, filed Jun. 23, 2014, 10 pages.
Notice of Allowance dated Dec. 1, 2015, for U.S. Appl. No. 12/238,333, filed Sep. 25, 2008, nine pages.
Notice of Allowance dated Jan. 8, 2016, for U.S. Appl. No. 13/448,182, filed Apr. 16, 2012, nine pages.
Rekimoto, J. (2002). "SmartSkin: An Infrastructure for Freehand Manipulation on Interactive Surfaces," *CHI 2002*, Apr. 20-25, 2002. [(Apr. 20, 2002). 4(1):113-1201.
Search Report dated Nov. 12, 2015, for ROC (Taiwan) Patent Application No. 103105965, with English translation, two pages.
Search Report dated Apr. 29, 2009, for NL Application No. 2001672, with English translation of Written Opinion, eight pages.
Search Report dated Oct. 14, 2015, for TW Application No. 103116003, one page.
Wilson, A.D. (Oct. 15, 2006). "Robust Computer Vision-Based Detection of Pinching for One and Two-Handed Gesture Input," *ACM, USIT '06*, Montreux, Switzerland, Oct. 15-18, 2006, pp. 255-258.
Yang, J-H. et al. (Jul. 2013). "A Noise-Immune High-Speed Read-out Circuit for In-Cell Touch Screen Panels," *IEEE Transactions on Circuits and Systems -1: Regular Papers* 60(7):1800-1809.
First Action Interview Pilot Program Pre-Interview Communication, date Apr. 4, 2019, for U.S. Appl. No. 15/686,969, filed Aug. 25, 2017, three pages.
Notice of Allowance dated Apr. 3, 2019, for U.S. Appl. No. 15/687,078, filed Aug. 25, 2017, eight pages.
Non-Final Office Action dated May 15, 2019 for U.S. Appl. No. 15/017,463, filed Feb. 5, 2016, 19 pages.
Final Office Action dated Feb. 6, 2019, for U.S. Appl. No. 15/009,774, filed Jan. 28, 2016, fifteen pages.
Non-Final Office Action dated Dec. 21, 2018, for U.S. Appl. No. 15/313,549, filed Nov. 22, 2016, thirteen pages.
Non-Final Office Action dated Feb. 11, 2019 , for U.S. Appl. No. 15/507,722, filed Feb. 28, 2017, fifteen pages.
Non-Final Office Action dated Jan. 18, 2019 , for U.S. Appl. No. 15/087,956, filed Mar. 31, 2016, twelve pages.
Non-Final Office Action dated Jan. 2, 2019, for U.S. Appl. No. 15/522,737, filed Apr. 27, 2017, thirteen pages.
Notice of Allowance dated Dec. 31, 2018, for U.S. Appl. No. 14/318,157, filed Jun. 27, 2014, eight pages.
Notice of Allowance dated Mar. 11, 2019, for U.S. Appl. No. 15/087,956, filed Mar. 31, 2016, ten pages.

\* cited by examiner

MC – Step 1

MC – Step 2

MC – Step 3

MC – Step 4

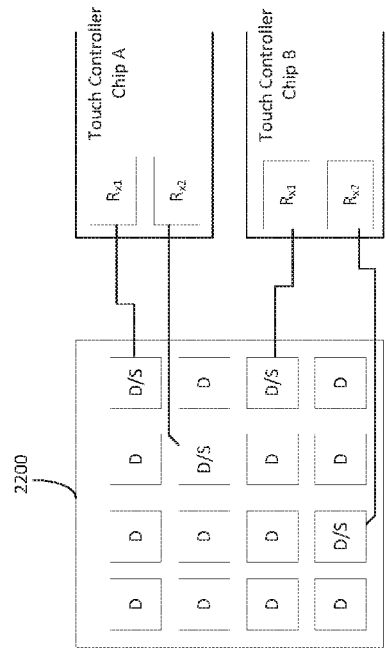

| Chip ID | Channel Number | Scan Type | Scan Step | Memory Location Corresponding to Physical Location |
|---|---|---|---|---|
| A | 1 | SC | 1 | 4 |
| A | 1 | SC | 2 | 3 |
| A | 1 | SC | 3 | 1 |
| A | 1 | SC | 4 | 2 |
| A | 2 | SC | 1 | 7 |
| A | 2 | SC | 2 | 8 |
| A | 2 | SC | 3 | 6 |
| A | 2 | SC | 4 | 5 |
| B | 1 | SC | 1 | 12 |
| B | 1 | SC | 2 | 4 |
| B | 1 | SC | 3 | 13 |
| B | 1 | SC | 4 | 9 |
| B | 2 | SC | 1 | 14 |
| B | 2 | SC | 2 | 15 |
| B | 2 | SC | 3 | 10 |
| B | 2 | SC | 4 | 16 |

FIG. 22E

| Chip ID | Channel Number | Scan Type | Scan Step | Memory Location Corresponding to Physical Location |
|---|---|---|---|---|
| A | 1 | MC | 1 | 6 |
| A | 1 | MC | 2 | 7 |
| A | 1 | MC | 3 | 1 |
| A | 1 | MC | 4 | 4 |
| A | 2 | MC | 1 | 8 |
| A | 2 | MC | 2 | 5 |
| A | 2 | MC | 3 | 3 |
| A | 2 | MC | 4 | 2 |
| B | 1 | MC | 1 | 16 |
| B | 1 | MC | 2 | 15 |
| B | 1 | MC | 3 | 11 |
| B | 1 | MC | 4 | 12 |
| B | 2 | MC | 1 | 14 |
| B | 2 | MC | 2 | 13 |
| B | 2 | MC | 3 | 9 |
| B | 2 | MC | 4 | 10 |

FIG. 21E

MULTI-CHIP TOUCH ARCHITECTURE FOR SCALABILITY

CROSS REFERENCE TO RELATED APPLICATIONS

This application claims the benefit of U.S. Provisional Application No. 62/131,242 filed on Mar. 10, 2015, the entire disclosure of which is herein incorporated by reference for all purposes.

FIELD OF THE DISCLOSURE

This relates generally to touch-sensitive devices, and more particularly, to multiprocessor touch controller architectures.

BACKGROUND OF THE DISCLOSURE

Many types of input devices are presently available for performing operations in a computing system, such as buttons or keys, mice, trackballs, trackpads, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. As the sizes of touch screens vary in size and across device platforms, existing touch controller architectures can be unsuitable for scalability.

SUMMARY

This relates to multi-chip touch architecture for scalability. A touch-sensitive device can include a touch sensor panel, one or more touch controller application specific integrated circuits (ASICs), and one or more switching circuits (e.g., ASICs) coupled between the one or more touch controller ASICs and the touch sensor panel. Each touch controller ASIC can be coupled to one or more switching circuits. The number of touch controller ASICs and switching circuits can be scaled based on the size of the touch sensor panel.

The touch controller ASICs can include an interface including one or more ports to communicate with one another and transfer touch data between the touch controller ASICs. The touch controller ASICs can be coupled together in a daisy chain configuration, and in some examples, in a ring configuration. The touch data can be transferred between the touch controller ASICs to allow each touch controller ASIC to store touch data representative of an image of touch for the touch sensor panel. The touch controller ASIC can use information including a chip identifier, a scan step, a scan type and a receive channel number to properly generate an image of touch from the touch data from the one or more touch controller ASICs. Storing touch data representative of the image of touch for the touch sensor panel can allow for parallel processing of the touch image by more than one touch controller ASIC.

A touch controller ASIC can include a receive section including a one or more receive channels, a transmit section and a panel scan engine. The touch controller ASIC can also include a memory configured to store touch data from the receive section and one or more processing circuits. The memory can include one or more access ports. The one or more processing circuits can directly access the memory and process the touch data stored in memory to enhance processing speeds. The touch controller ASIC can also include circuitry to dynamically adjust the coupling between portions (e.g., banks) of memory and inputs of the one or more processing circuits to minimize data transfer and improve processing speeds.

The one or more processing circuits can include one or more hardware accelerators to further enhance processing speeds. Hardware accelerators can process two dimensional touch data representing an image of touch to identify one or more touch events and perform centroid calculations. The touch processing information can be used to update coupling between the touch controller ASIC and the touch sensor panel. Hardware accelerators can be used to perform various algorithms necessary for touch processing.

The touch controller ASIC can also include a scan sequencer. The scan sequencer can decode and/or process synchronization signals received from a host processor to sequence the proper performance of scanning operations. The synchronization signals can be used to identify periods of time with minimal interference to perform scanning operations (e.g., intra-frame pauses). The scan sequencer can generate signals to reprogram or adjust the coupling of one or more switching circuits. The scan sequencer can also abort execution of one or more planned scans based on touch processing results.

BRIEF DESCRIPTION OF THE DRAWINGS

FIGS. 21A-21E illustrate an example mapping operation for a mutual capacitance scan according to examples of the disclosure.

FIGS. 22A-22E illustrate an example mapping operation for a self-capacitance scan according to examples of the disclosure.

DETAILED DESCRIPTION

Figure 1A:
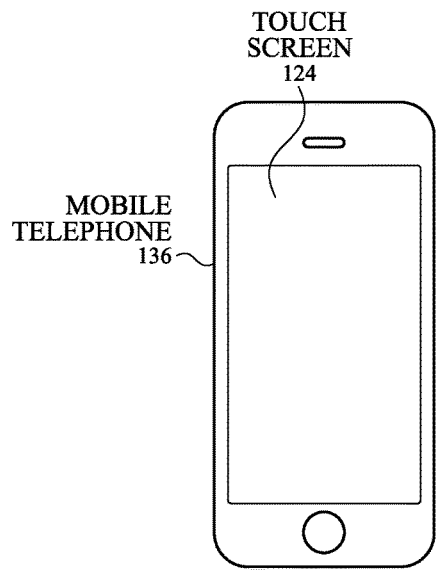
FIGS. 1A-1D illustrate example systems that can include multiprocessor touch controller architectures to implement touch sensing operations according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to multi-chip touch architecture for scalability. A touch-sensitive device can include a touch sensor panel, one or more touch controller application specific integrated circuits (ASICs), and one or more switching circuits coupled between the one or more touch controller ASICs and the touch sensor panel. Each touch controller ASIC can be coupled to one or more switching circuits. The number of touch controller ASICs and switching circuits can be scaled based on the size of the touch sensor panel.

The touch controller ASICs can include an interface including one or more ports to communicate with one another and transfer touch data between the touch controller ASICs. The touch controller ASICs can be coupled together in a daisy chain configuration, and in some examples, in a ring configuration. The touch data can be transferred between the touch controller ASICs to allow each touch controller ASIC to store touch data representative of an image of touch for the touch sensor panel. The touch controller ASIC can use information including a chip identifier, a scan step, a scan type and a receive channel number to properly generate an image of touch from the touch data from the one or more touch controller ASICs. Storing touch data representative of the image of touch for the touch sensor panel can allow for parallel processing of the touch image by more than one touch controller ASIC.

A touch controller ASIC can include a receive section including a one or more receive channels, a transmit section and a panel scan engine. The touch controller ASIC can also include a memory configured to store touch data from the receive section and one or more processing circuits. The memory can include one or more access ports. The one or more processing circuits can directly access the memory and process the touch data stored in memory to enhance processing speeds. The touch controller ASIC can also include circuitry to dynamically adjust the coupling between portions (e.g., banks) of memory and inputs of the one or more processing circuits to minimize data transfer and improve processing speeds.

The one or more processing circuits can include one or more hardware accelerators to further enhance processing speeds. Hardware accelerators can process two dimensional touch data representing an image of touch to identify one or more touch events and perform centroid calculations. The touch processing information can be used to update coupling between the touch controller ASIC and the touch sensor panel. Hardware accelerators can be used to perform various algorithms necessary for touch processing.

The touch controller ASIC can also include a scan sequencer. The scan sequencer can decode and/or process synchronization signals received from a host processor to sequence the proper performance of scanning operations. The synchronization signals can be used to identify periods of time with minimal interference to perform scanning operations (e.g., intra-frame pauses). The scan sequencer can generate signals to reprogram or adjust the coupling of one or more switching circuits. The scan sequencer can also abort execution of one or more planned scans based on touch processing results.

Figure 1B:
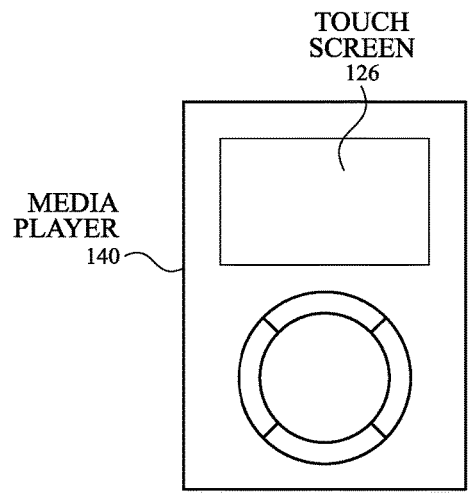
Figure 1C:
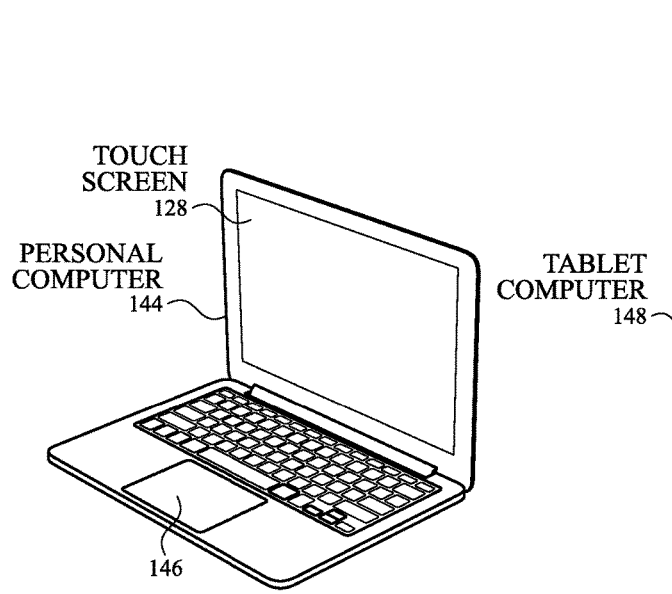
Figure 1D:
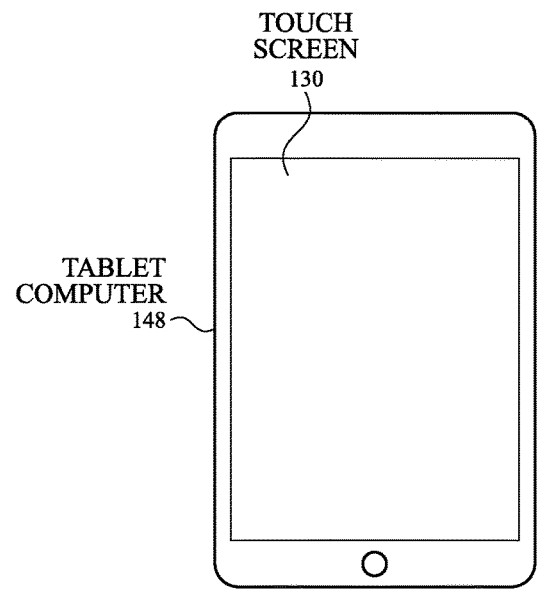

FIGS. 1A-1D illustrate example systems that can include multiprocessor touch controller architectures to implement touch sensing operations according to examples of the disclosure. FIG. 1A illustrates an example mobile telephone 136 that includes a touch screen 124 and can include multiprocessor touch controller architectures to implement touch sensing operations according to examples of the disclosure. FIG. 1B illustrates an example digital media player 140 that includes a touch screen 126 and can include multiprocessor touch controller architectures to implement touch sensing operations according to examples of the disclosure. FIG. 1C illustrates an example personal computer 144 that includes a touch screen 128 and can include multiprocessor touch controller architectures to implement touch sensing operations according to examples of the disclosure. Additionally, the multiprocessor touch controller architectures can implement touch sensing operations for other touch interfaces without a display, such as for trackpad 146 in FIG. 1C. FIG. 1D illustrates an example tablet computing device 148 that includes a touch screen 130 and can include multiprocessor touch controller architectures to implement touch sensing operations according to examples of the disclosure. The touch screen and multiprocessor touch controller architectures can be implemented in other devices including wearable devices. Additionally or alternatively, the multiprocessor touch controller architecture can include multiple touch controller chips for scalability depending on the size of the touch screen or touch sensitive surface of a device.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
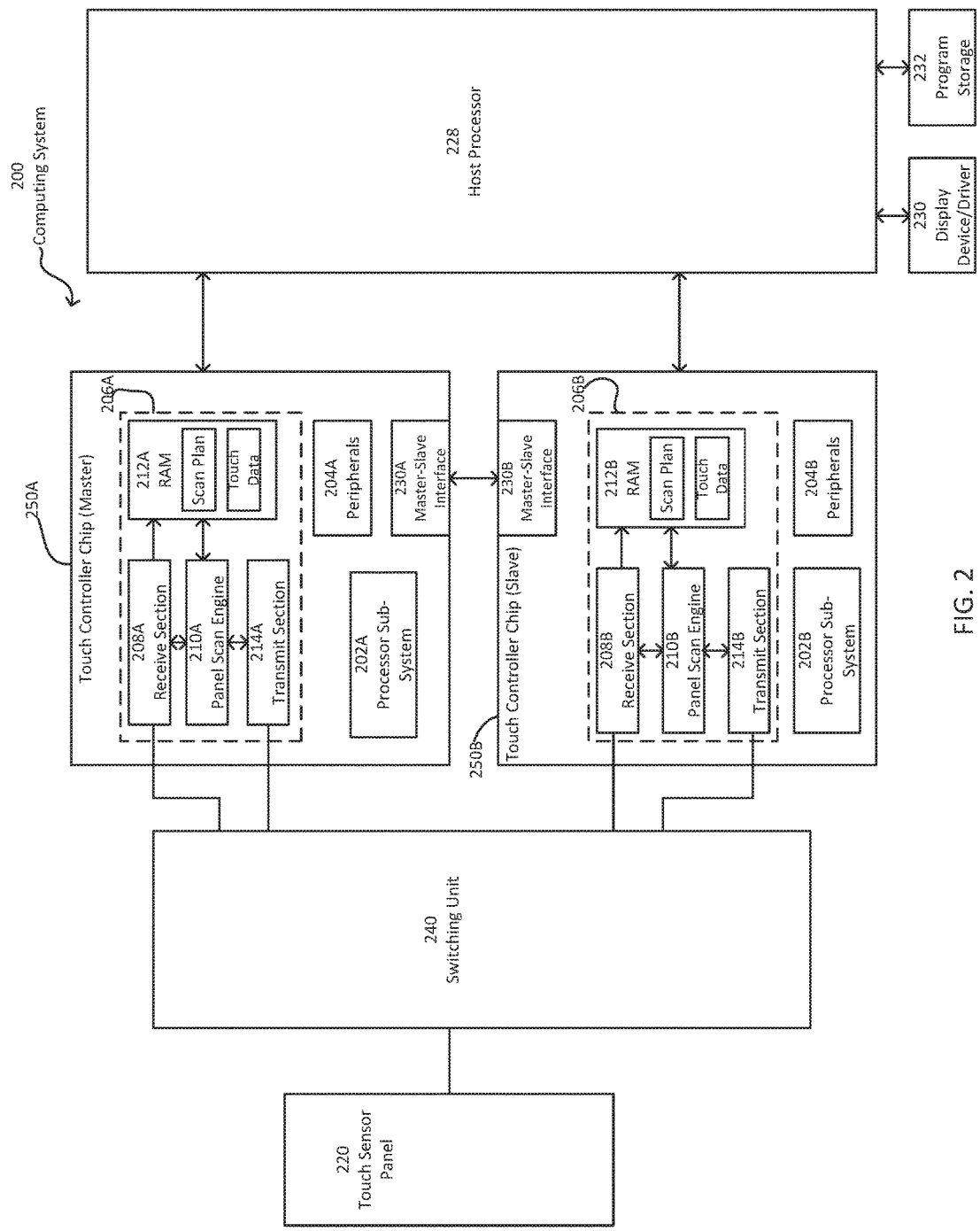
FIG. 2 illustrates an example computing system that can include multiple touch controller circuits to implement touch sensing operations according to examples of the disclosure.

FIG. 2 illustrates an example computing system that can include multiple touch controller circuits (e.g., multiple chips) to implement touch sensing operations according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include two touch controller circuits 250A and 250B, though in other examples the computing system can include only one touch controller circuit or more than two touch controller circuits depending on the size of the touch screen or touch sensitive surfaces (e.g., each with circuitry such as the circuitry illustrated in touch controller circuit 250A). As illustrated in FIG. 2, touch controller 206A, touch processor 202A and peripherals 204A can be integrated into a single application specific integrated circuit (ASIC) (i.e., single chip). Likewise, touch controller 206B, touch processor 202B and peripherals 204B can be integrated into a single ASIC. Touch controller circuits 250A and 250B can include the same or substantially similar components. Although illustrated in FIG. 2 as a single ASIC, the touch controller circuit 250A including one or more touch processors 202A, peripherals 204A, and touch controller 206A, the various components can be implemented with multiple chips, circuits and/or discrete components.

For simplicity the discussion of subsystems and components of touch controller circuits focuses on touch controller circuit 250A, but it is understood that the function of similar subsystems and components in touch controller circuit 250B can have the same or substantially similar functionality. Peripherals 204A can include, but are not limited to, random access memory (RAM) or other types of memory or storage, watchdog timers and the like. Touch controller 206A can include, but is not limited to, one or more sense channels in receive section 208A, panel scan engine 210A (which can include channel scan logic) and transmit section 214A (which can include driver logic). Panel scan engine 210A can access RAM 212A (which can include scan plan information and can be used to store touch data generated by scanning operations), autonomously read data from the sense channels and provide control for the sense channels. In addition, panel scan engine 210A can provide control for transmit section 214A to generate stimulation signals at various frequencies and/or phases that can be selectively applied to drive regions of the touch sensing circuitry of touch sensor panel 220. In some implementations, the touch sensor panel 220 can be integrated with a display to form a touch screen, though in other implementations the touch sensor panel 220 can be independent of the display and/or substantially cover the area of the display.

Computing system 200 can also include switching unit 240 (peripheral switching unit). In some examples switching unit can include a plurality of switches to couple the receive section (208A and/or 208B) and/or the transmit section (214A and/or 214B) to the proper electrodes and/or drive/sense lines of touch sensor panel 220. In some examples, the switching unit 240 can include one or more multiplexers (MUXs) to perform the switching functions. Additionally, some of the coupling between receive and/or transmit sections can be hardwired (via the switching unit 240 or bypassing switching unit 240). Although, illustrated as a single block, in some examples, the switching unit 240 can include a plurality of ASIC chips and/or discrete components to perform switching functions. For example, for the computing system illustrated in FIG. 2, the switching unit can include two ASICs, each ASIC implementing switching function for one of the two touch controller circuits 250A and 250B. In other examples, the switching unit can include a plurality of ASICs for each of the touch controller circuits (e.g., two switching ASICs per touch controller circuit). Additionally, in some examples, the switching units can be coupled to more than one touch controller circuit to permit connection between some or all electrodes and/or drive/sense lines of the touch sensor panel 220 and the receive sections and/or transmit sections of the one or more touch controller circuits. In other examples, the interconnection between the touch sensor panel and channels of the plurality of touch controller circuits can be limited based on routing and scanning complexity concerns. In some examples, when the electrodes of a panel can be divided among a plurality of touch controller circuits (e.g., half of the electrodes allocated to one touch controller circuit and half the electrodes allocated to a second touch controller circuit), the electrodes at the boundary between portions of the touch sensor panel can be prioritized to allow for coupling between the electrodes proximate to the boundary and either of the touch controller circuits scanning on either side of the boundary.

It should be understood that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Touch controller circuits 250A and 250B can operate together to perform touch sensing or other scanning operations. As illustrated in FIG. 2, touch controller circuit 250A can operate as a master touch controller and touch controller circuit 250B can operate as a slave touch controller. In some examples, the touch sensing or other scanning operations can be divided between the master and slave touch controller circuits by having each touch controller circuit scan half of the touch sensor panel. Each touch controller circuit can store the touch data produced by the scans in their respective memory. The master and slave touch controllers can communicate via a master-slave interface 230A and 230B to allow the processors subsystems 202A and 202B and/or touch controllers 206A and 206B to exchange information. Additionally, the slave touch controller circuit can transfer its touch data to the master touch controller circuit at various times (e.g., in response to an interrupt or synchronization signal), and the master touch controller circuit can process the combined touch data (forming a complete "image of touch") for the touch sensor panel.

Computing system 200 can include a host processor 228 for receiving outputs from touch controller circuits 250A and 205B (e.g., via touch processors 202A and 202B) and performing actions based on the outputs. For example, host processor 228 can be connected to program storage 232 and a display or display controller, such as a Liquid-Crystal Display (LCD) driver 234. It is understood that although the examples of the disclosure are described with reference to LCD displays, the scope of the disclosure is not so limited and can extend to other types of displays, such as Light-Emitting Diode (LED) displays, including Active-Matrix Organic LED (AMOLED) and Passive-Matrix Organic LED (PMOLED) displays.

Host processor 228 can use LCD driver 234 to generate and display an image on a display (e.g., on the touch screen formed by the touch sensor panel and LCD display), such as an image of a user interface (UI), and can use touch controller circuits 250A and 250B (including touch processors 202A and 202B and touch controllers 206A and 206B) to detect a touch on or near touch sensor panel 220, such as a touch input to the displayed UI of the touch screen formed by touch sensor panel 220 and the LCD display. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

In some examples, RAM 212A, RAM 212B, program storage 232, or one or more of the above storage, can be non-transitory computer readable storage media. One or more of RAM 212A, RAM 212B, and program storage 232 can have stored therein instructions, which when executed by touch processor 202A, touch processor 202B, or host processor 228 or both, can cause the device including computing system 200 to perform one or more functions and methods of one or more examples of this disclosure.

Note that one or more of the functions described herein, including the configuration of switches, can be performed by firmware stored in memory (e.g., one of the peripherals 204A and 204B in FIG. 2) and executed by touch processors 202A and 202B, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, Universal Serial Bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
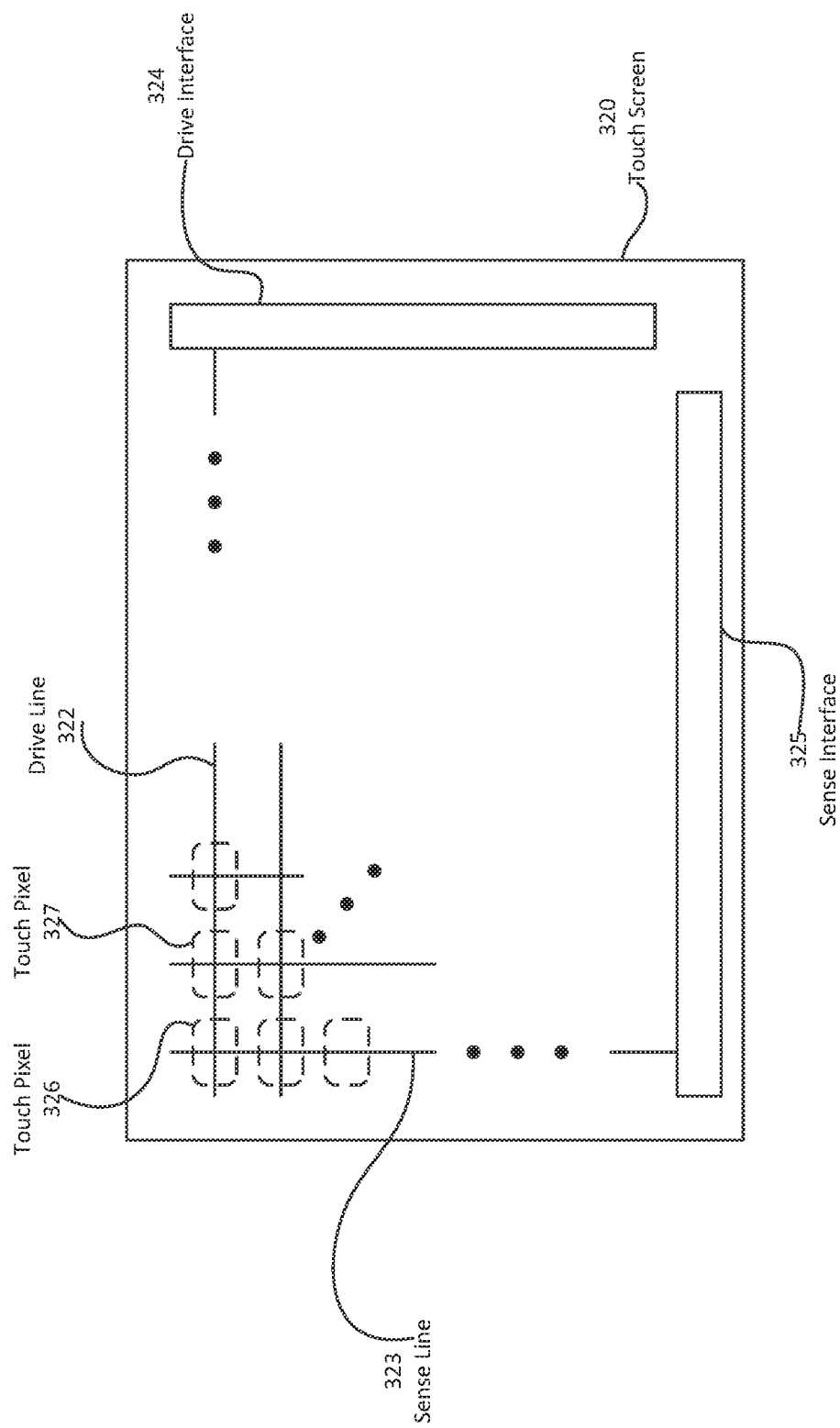
FIG. 3 illustrates an example touch screen including a touch sensor panel configured with drive and sense lines according to examples of the disclosure.

As discussed above, the touch sensor panel 220 can be coupled to and/or integrated with a display to form a touch screen. FIG. 3 illustrates an example touch screen including a touch sensor panel configured with drive and sense lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc.

Additionally, the drive lines 322 and sense lines 323 can be formed from smaller electrodes coupled together to form drive lines and sense lines. Drive lines 322 can be driven by stimulation signals from the transmit section 214A and/or 214B through a drive interface 324, and resulting sense signals generated in sense lines 323 can be transmitted through a sense interface 325 to sense channels in receive section 208A and/or 208B (also referred to as an event detection and demodulation circuit) in touch controllers 206A and/or 206B. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controllers 206A and/or 206B have determined whether a touch has been detected at each touch pixel in the touch screen, the pattern of touch pixels in the touch screen at which a touch occurred can be thought of as an "image" of touch (e.g., a pattern of fingers or other objects touching the touch screen).

Figure 4:
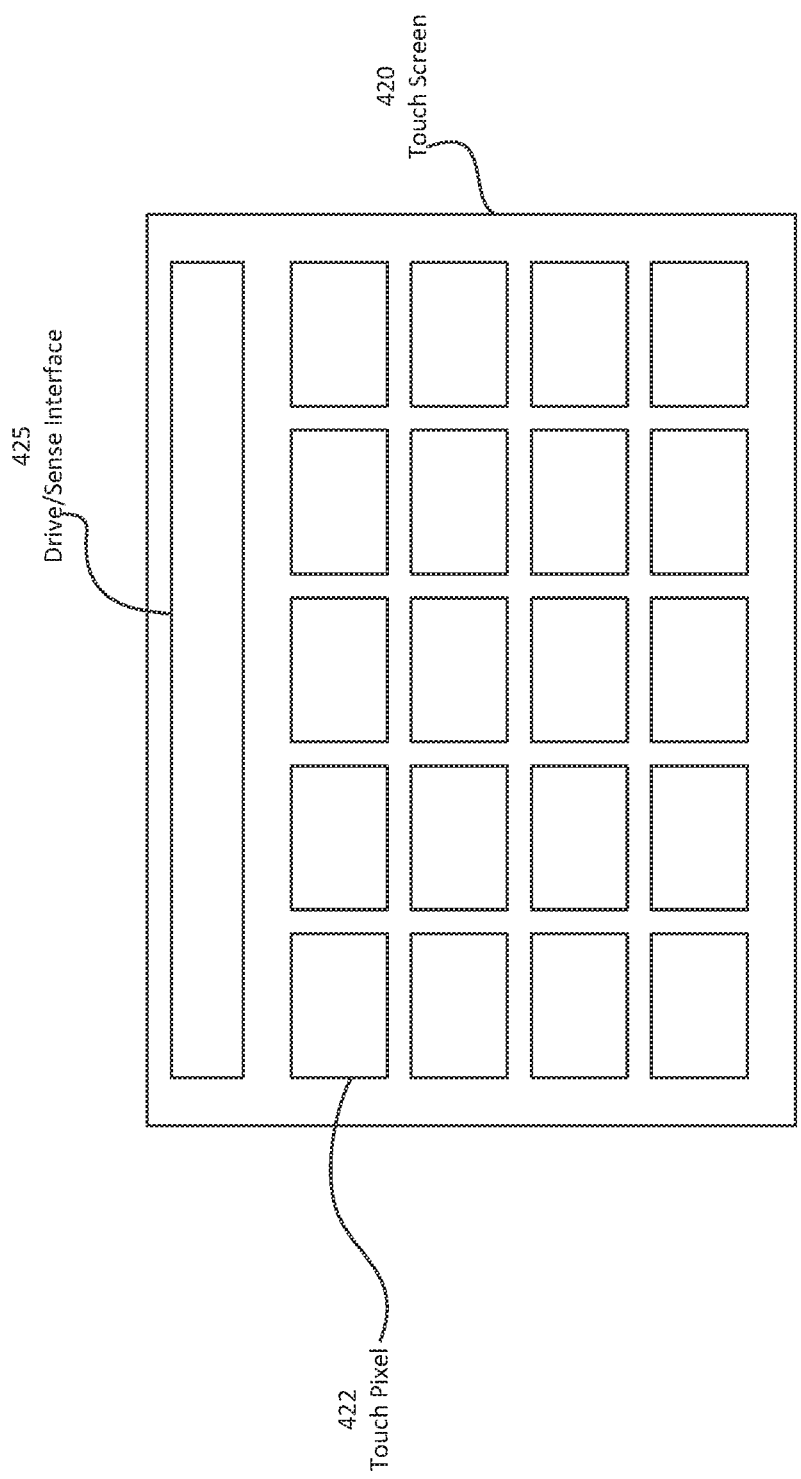
FIG. 4 illustrates an example touch screen including a touch sensor panel configured with self-capacitance electrodes according to examples of the disclosure.

Additionally or alternatively the touch screen can include self-capacitance touch sensing circuitry including an array of self-capacitance electrodes. FIG. 4 illustrates an example touch screen including a touch sensor panel configured with self-capacitance electrodes according to examples of the disclosure. Touch screen 420 can include touch sensing circuitry that can include a capacitive sensing medium having a plurality of electrically isolated touch pixel electrodes 422 (e.g., a pixelated self-capacitance touch screen). Touch pixel electrodes 422 can be coupled to sense channels in receive section 208A and/or 208B in touch controllers 206A and/or 206B, can be driven by stimulation signals from the sense channels (or transmit section 214A and/or 214B) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controllers 206A and/or 206B have determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen).

As discussed above, the touch sensor panel and display areas can partially or fully overlap. In some examples, the touch sensor panel and display can be discrete components that can be coupled together (e.g., adhering the touch sensor on top of the display). In other examples, the touch sensor panel can be integrated with the display stack-up, and may share some electrical components between sensing and display functions. In some examples, portions of the touch sensor panel can be integrated within the display stack-up (e.g., on-cell) and in other examples, the touch sensor panel can be fully integrated within the display stack-up (e.g., in-cell).

The touch sensor panel/touch screen can detect touch or proximity events from one or more objects including one or more fingers and/or styli. They styli can include a passive stylus and/or an active stylus (e.g., a stylus that can generate a stimulus signal to inject into the touch sensor panel).

Figure 5:
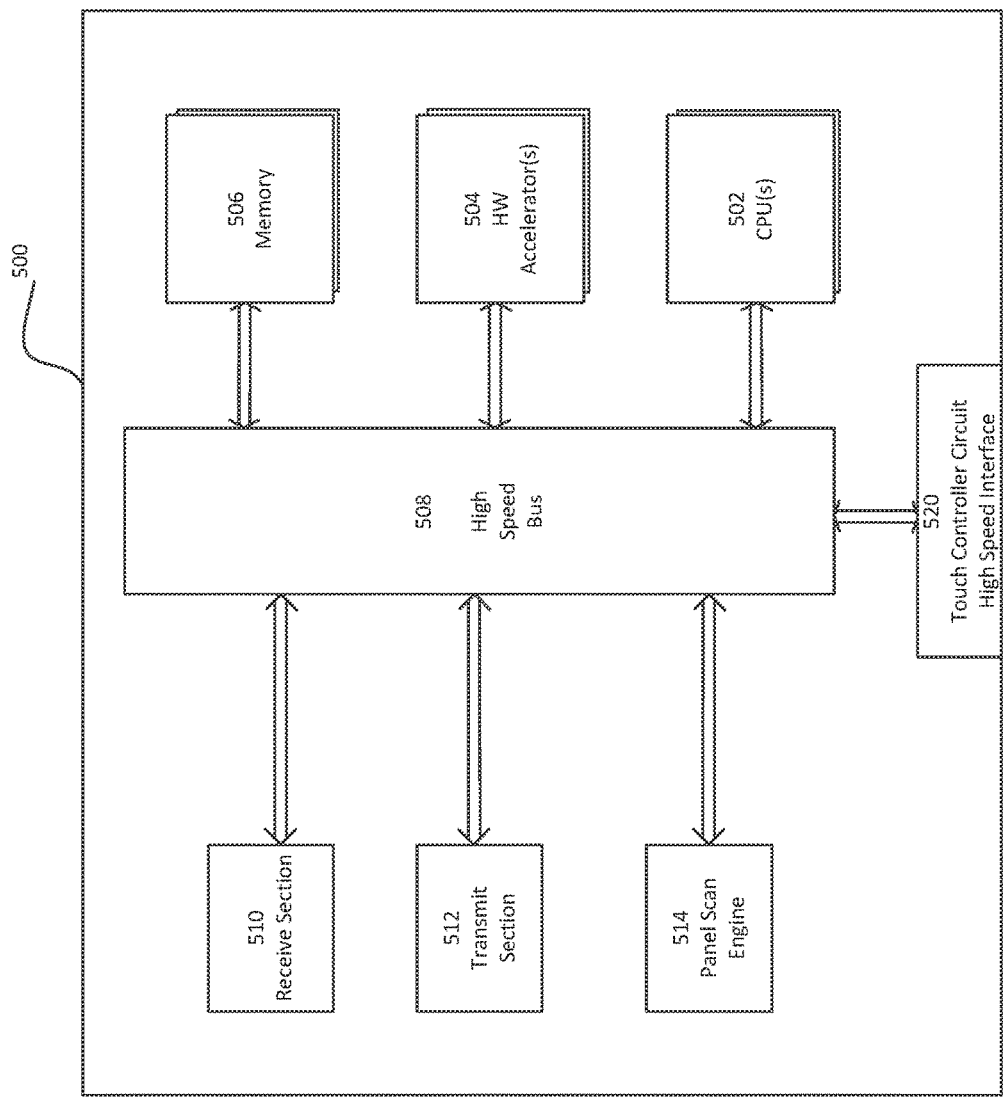
FIG. 5 illustrates an example block diagram for a multiprocessor touch controller circuit architecture according to examples of the disclosure.

In other examples, the architecture of the touch controller circuit can include one or more processors performing micro-sequences or firmware operations and/or one or more hardware acceleration units to replace or supplement micro-sequences or firmware operations. FIG. 5 illustrates an example block diagram for a multiprocessor touch controller circuit architecture according to examples of the disclosure. Touch controller circuit 500 can be an ASIC, or alternatively include multiple circuits including different chips, modules, and/or discrete components. As illustrated in FIG. 5, touch controller circuit 500 can include one or more processors 502, including one or more central processing units (CPUs), microcontrollers, or digital signal processors (DSP). Additionally or alternatively, touch controller circuit 500 can include one or more hardware accelerators 504. Hardware accelerators 504 can accelerate execution of certain operations—such as processing touch data—as will be discussed below in more detail.

Touch controller circuitry 500 can also include one or more memory circuits 506, including RAM and ROM. The RAM can be arranged to include a plurality of banks, for example. In order to enable one or more processors 502 and/or multiple hardware accelerators 504 to perform operations on data stored within memory circuits 506, the memory circuits can be designed to include multiple ports (e.g., direct memory access (DMA) ports). Sharing the memory between different processing components can increase processing performance for multi-processor architectures, instead of having to access data via an indirect route which can create processing bottlenecks and reduce or negate the benefits of multiple processors operating in parallel. The number of memory ports can be limited by routing constraints and memory access complexity constraints among other constraints.

Touch controller circuitry 500 can also include a high speed bus 508 to permit communication and data transfer between various blocks in touch controller circuitry 500. Although other connections and coupling between the blocks of touch controller circuitry 500 can be possible (e.g., dedicated lines for direct memory access between the memory and the one or more processors and/or one or more hardware accelerators).

Touch controller circuitry 500 can also include circuitry for performing touch sensing and other scanning operations. For example, touch controller can include, but is not limited to, one or more sense channels in receive section 510, panel scan engine 514 and transmit section 512.

A sense channel in receive section 510 can include, for example, a trans-impedance amplifier circuit (TIA), a band pass filter, an analog-to-digital converter (ADC) and one or more demodulation circuits (e.g., implemented with one or more digital signal processor (DSP) channels). In some examples, the demodulation circuits can be implemented as part of the panel scan engine 514 instead of in the receive section 510. The one or more DSP channels can perform simultaneous processing of the signals output from the ADC for the channel. For example, a first DSP channel can perform spectral analysis at a first frequency, a second DSP channel can perform spectral analysis at a second frequency, a third DSP channel can demodulate stylus/pen scan results at a third frequency and a fourth DSP channel can demodulate the stylus/pen scan results at a fourth frequency. The number of DSP channels for each channel can be different, and the number of DSP channels processing in parallel can depend on the type of touch sensing or other scanning operation performed and the desired demodulation and processing results.

The transmit section 512 can include one or more oscillators, a transmit digital-to-analog converter (TX DAC), and switching circuitry (e.g., MUXs) to select between various drive signals (e.g., DC voltages, AC voltages with different frequencies and/or phase).

Panel scan engine 514, which can include a scan sequencer (not shown), can execute a scan plan based on synchronization signals from the host processor, can access memory to read scan plan information and can store touch data generated by scanning operations in the memory. Panel scan engine 514 can also configure the receive section 510 and/or transmit section 512 according to the scan plan. Configuring the receive section 510 and/or transmit section 512 can include generating signals to properly couple sense channels and/or drive channels to the appropriate touch sensor electrodes, drive lines and/or sense lines. The coupling can be performed by the switching unit 240 (which can receive the generated signals from the touch controller circuit) including one or more switching unit circuits. The switching unit 240 can interpret and/or use the generated signals to perform the coupling. Panel scan engine can 514 also autonomously read data from the sense channels and provide control for the sense channels. In addition, panel scan engine 514 can provide control for transmit section to generate stimulation signals at various frequencies and/or phases that can be selectively applied to drive regions of the touch sensing circuitry of touch sensor panel 220.

In some examples, two processors of touch controller circuit 500 can be configured to perform touch sensing or other scanning operations on the touch sensor panel. One processor for example can operate as a master processor and another processor can operate as a slave processor. The receive section 510, transmit section 512, and panel scan engine 514 can be implemented to be shared for touch sensing and other scanning operations by the master and slave. Alternatively, each of the master and the slave processor can have a separate receive section, transmit section and panel scan engine for executing touch sensing and other scanning operations. The master and slave operations can be performed in a similar way as discussed with respect to the architecture of FIG. 2, though touch data need not be transferred between two different touch controller circuits as in FIG. 2.

Additionally, touch controller circuit 500 can include a touch controller circuit high speed interface 520. The high speed interface can include one or more interface ports to permit communication between multiple touch controller circuits as will be discussed below in more detail. Using multiple touch controller circuits (chips) like the touch controller circuit of FIG. 5 can allow for scaling the size of a touch screen or touch sensitive surface without designing a new touch controller chip architecture. The touch controller circuit of FIG. 5 can replace one or more of the touch controller circuits in FIG. 2. The touch controller circuit of FIG. 5 can be coupled to one or more peripheral switching units to appropriately couple the touch controller circuit to some or all of the electrodes of the touch sensor panel/touch screen.

It should be apparent that the architecture shown in FIG. 5 is only one example architecture of a touch controller circuit, and that the touch controller circuit could have more or fewer components than shown, or a different configuration of components. The various components shown in FIG. 5 can be implemented in hardware, software, firmware or any combination thereof, including one or more signal processing and/or application specific integrated circuits.

Figure 6:
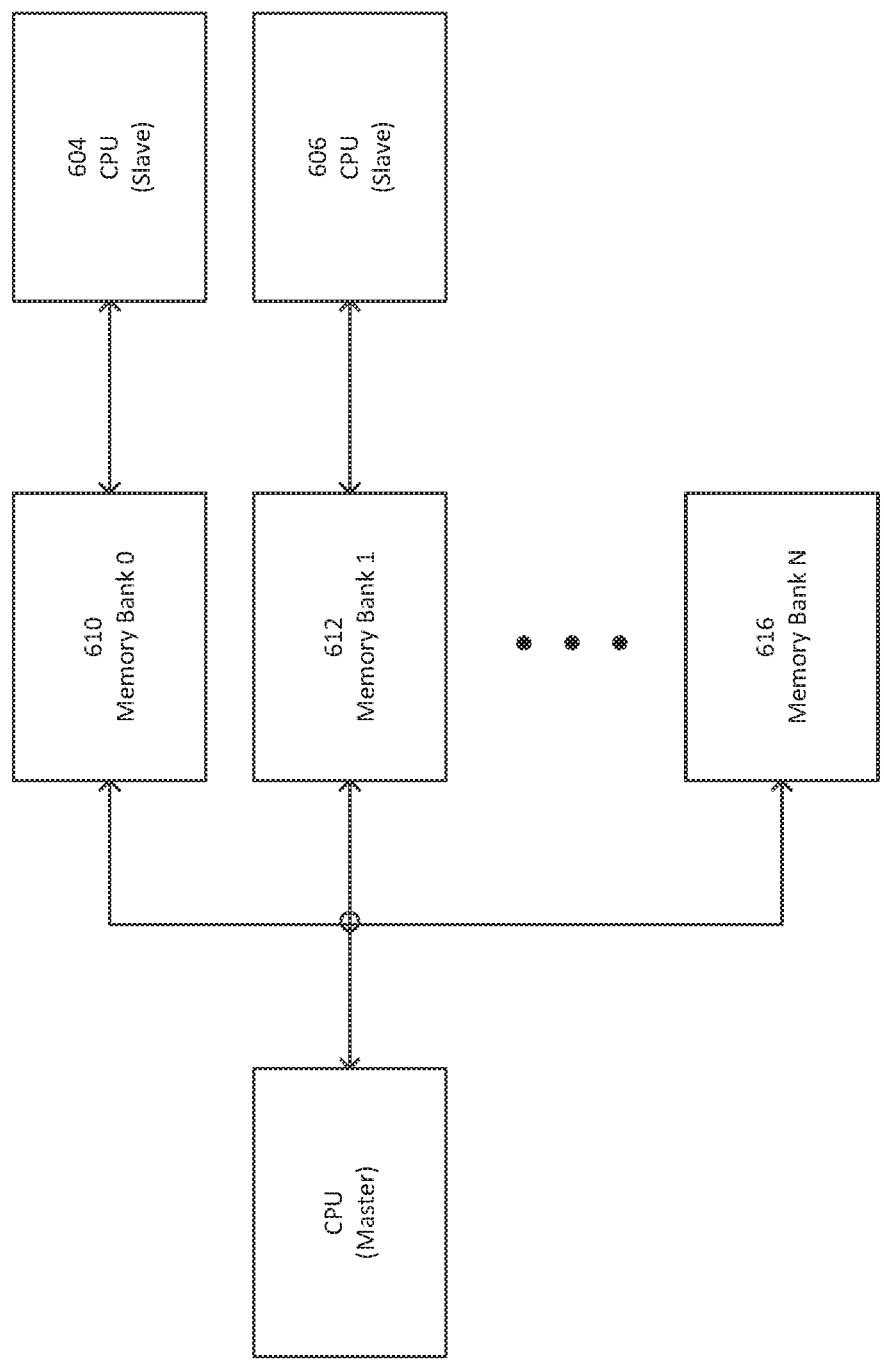
FIG. 6 illustrates an example configuration of memory and a plurality of processors according to examples of the disclosure.

In order to take advantage of the one or more processors and/or the one or more hardware accelerators, the touch controller circuit can be designed to minimize data movement. Moving data between the memory and the one or more processors can become a bottleneck that prevents the one or more processors and/or the one or more hardware accelerators from increasing the operating speed of the touch controller circuit. FIG. 6 illustrates an example configuration of memory and a plurality of processors according to examples of the disclosure. FIG. 6 illustrates a plurality of processors, including master CPU 602, slave CPUs 604 and 606, and memory organized into a plurality of memory banks, including memory banks 610, 612 and 616. Master CPU 602 can be coupled to each of N memory banks for direct memory access, although in some examples, the master CPU 602 can be coupled to fewer than all N memory banks. Slave CPU 604 can be coupled to one or more memory banks, and as illustrated in FIG. 6 can be coupled to memory bank 610. Likewise, slave CPU 606 can be coupled to one or more memory banks, and as illustrated in FIG. 6 can be coupled to memory bank 612. The number of memory banks the slave CPUs can be coupled to can depend on the number of memory banks necessary to perform the operations associated with the one or more slave processors.

Although one master processor and two slave processors are illustrated in FIG. 6, the touch controller circuit can include a smaller or larger number of processors, configured in a master slave configuration or in a different configuration. Additionally, the number of memory banks for the system can vary depending on the memory needs of the touch controller circuit. Additionally, although the figure illustrates slave processors, one or more of the slave processors can be replaced with one or more hardware accelerators in other examples.

Figure 7:
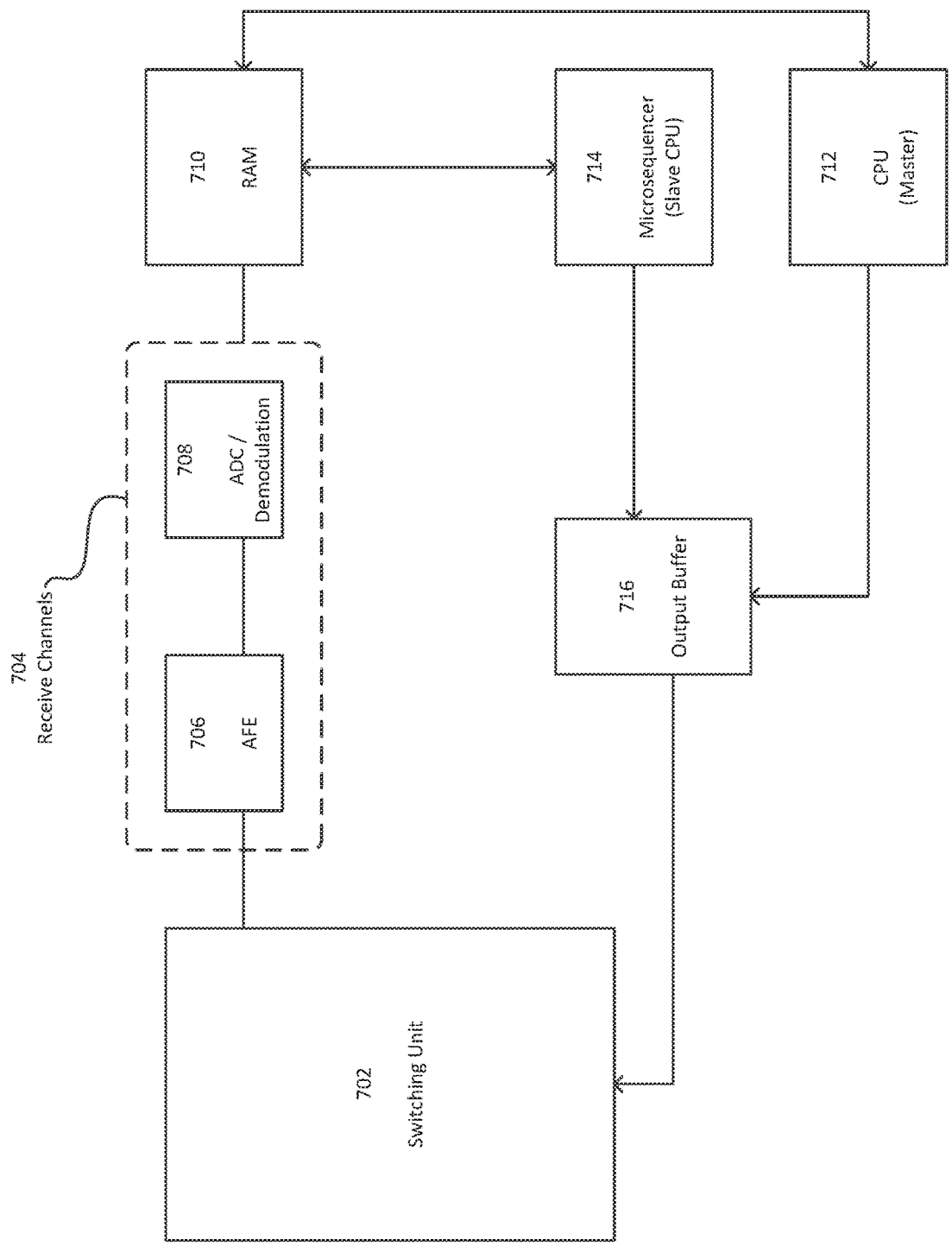
FIG. 7 illustrates an example block diagram for improving touch data processing speeds according to examples of the disclosure.

One or more processors and/or one or more hardware accelerators can be useful to reduce processing time for various algorithms. For example, processing touch data (which can be viewed as an "image of touch") can require a number of algorithms that can be executed faster by distributed parallel processing across multiple processors and/or hardware accelerators. FIG. 7 illustrates an example block diagram for improving touch data processing speeds according to examples of the disclosure. As illustrated in FIG. 7, signals generated from touch sensing or scanning operation (e.g., a coarse self-capacitance scan) can be transmitted via switching unit 702 (peripheral switching unit) to receive channels 704 (sense channels). For simplicity, FIG. 7 illustrates one channel of receive channels 704. The one illustrated channel can include an analog front end (AFE) 706 (e.g., including a TIA and a band pass filter) and an ADC/demodulation section 708 including one or more DSP channels to process signals output form the ADC. The touch data processed from the one or more DSP channels can be stored in memory, such as RAM 710. As discussed above with regard to FIG. 6, the RAM can be accessible by multiple processors, such as master CPU 712 and slave CPU/micro-sequencer 714. In order to improve processing of the touch data stored in RAM 710, slave CPU/micro-sequencer 714 can run firmware to process the touch data stored in RAM (e.g., as a two dimensional image of touch) to detect one or more touch events and determine the centroid of one or more touch events (when touch events are detected). The micro-sequencer can generate output information about whether a touch event is detected and the centroid of one or more touch events which can be transmitted to an output buffer 716. Output buffer 716 can transmit signals to the switching unit 702 to control the coupling functions of switching unit 702 for future scan events that can be based upon the detection of one or more touch events and the location of the centroid of the one or more touch events. In some examples, the updated switching by switching unit 702 can allow the touch controller circuit to perform a targeted scan (e.g., scanning specific coordinates of the touch sensor panel where touch events were detected during the coarse scan).

In some examples, the information transmitted by output buffer 716 can be transmitted to switching unit 702 via an inter-integrated circuit (I2C) interface or a serial peripheral interface (SPI). The output from the output buffer can also be adjusted based on an address offset from the master CPU 712 or override signals from the master CPU 712. Additionally, the processed touch data can be mapped from the centroid information to information understandable by the switching unit 702. For example, a logic circuit or micro-sequence can be used to map centroid information generated by the slave CPU/micro-sequencer 714 to the switching functions necessary for subsequent scans of the touch sensor panel. Alternatively, switching unit 702 can include intelligence to map centroid information to properly switch the coupling between the touch controller circuit and the touch sensor panel.

Figure 8:
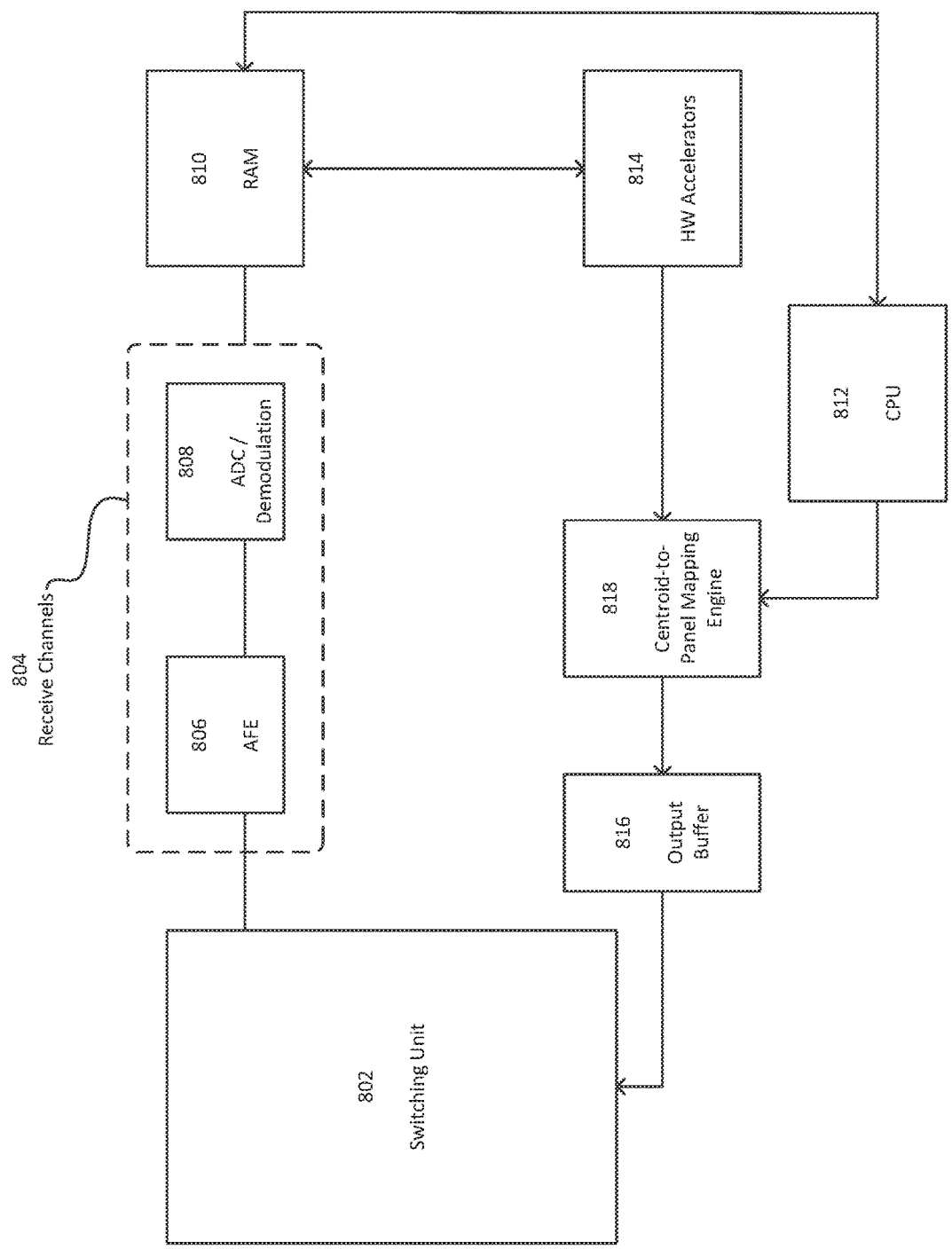
FIG. 8 illustrates another example block diagram for improving touch detection and processing according to examples of the disclosure.

FIG. 8 illustrates another example block diagram for improving touch detection and processing according to examples of the disclosure. FIG. 8 also illustrates switching unit 802 (peripheral switching unit), receive channels 804 (including AFE 806 and ADC/demodulation circuit 808), memory 810, master CPU 812, and output buffer 816. The functionality of these components can be the same or substantially similar to the functionality of the corresponding components in FIG. 7 and will be omitted here for simplicity. Instead of improving processing with a micro-sequencer 714 running firmware, the block diagram includes one or more hardware accelerators 814, which can include one or more hardware accelerator circuits. The one or more hardware accelerators 814 can implement some of the same algorithms performed by micro-sequencer 714, but with hardware rather than firmware to improve processing speed. The output of touch data processing by the one or more hardware accelerators can also be mapped to appropriate switching functionality by centroid-to-panel mapping engine 818.

Figure 9:
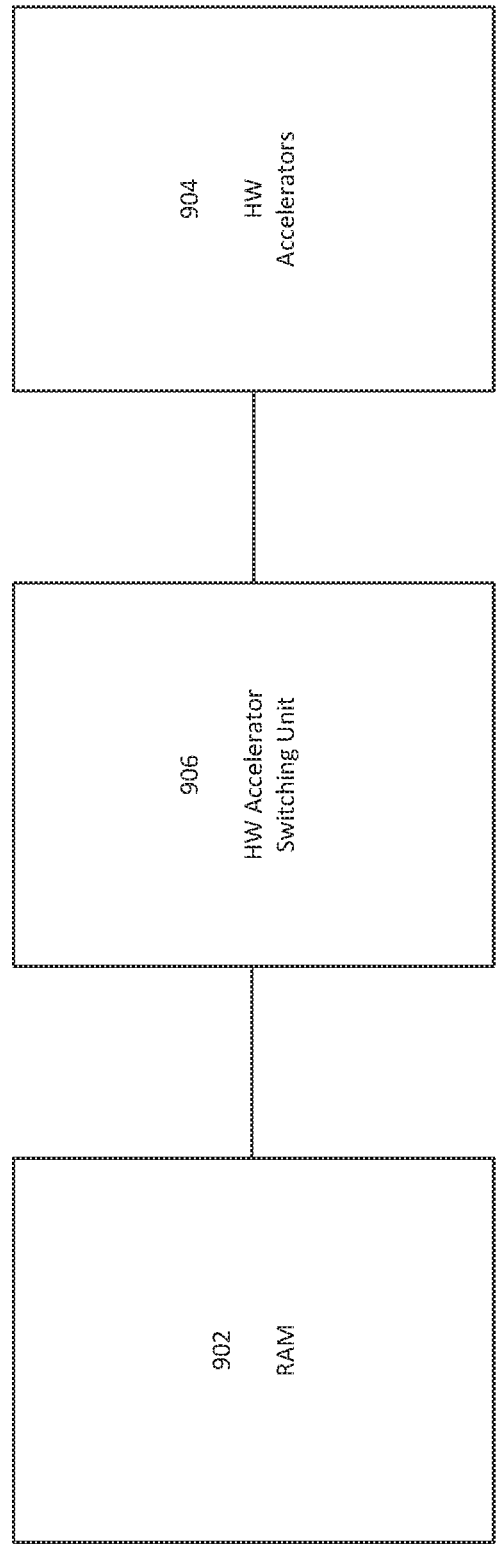
FIG. 9 illustrates an example block diagram for coupling memory to one or more hardware accelerators according to examples of the disclosure.

In order to improve the touch data processing performance, the coupling between the one or more hardware accelerators and the memory can be dynamically reconfigured to reduce the data movement which can act as a bottleneck. FIG. 9 illustrates an example block diagram for coupling memory to one or more hardware accelerators according to examples of the disclosure. The block diagram of FIG. 9 can include RAM 902 (including one or more memory devices), one or more hardware accelerators 904 and a hardware acceleration switching unit 906. In some examples, the hardware acceleration switching unit 906 can couple any memory bank of RAM 902 to any input or output of the one or more hardware accelerator circuits. In other examples, the hardware accelerators can be configurable to couple to fewer than all memory banks of RAM 902. The switching functionality of hardware acceleration switching unit 906 can include a plurality of switches or MUXs or other switching circuitry to couple memory banks or locations to inputs and outputs of the hardware accelerator so as to reduce touch data transfer. Control signals to control the hardware acceleration switching unit can be generated by one or more of the hardware accelerator 904, a master processor (not shown), and a host processor (not shown).

As discussed above, touch data processing algorithms can be performed by hardware accelerator circuits to improve processing speeds. FIGS. 10-13 illustrate example block diagrams for implementing some touch data processing algorithms with hardware accelerators with minimal data movement. Additionally or alternatively, these algorithms can also be performed by slave processors running firmware with minimal data movement. The algorithms implemented by processors or hardware accelerators can include one or more of baseline subtraction and offset correction, thresholding, image diffusion, sorting a thresholded image, watershedding (i.e., a watershed algorithm), and centroid calculation, although other algorithms can be implemented in hardware accelerators as well.

Figure 10:
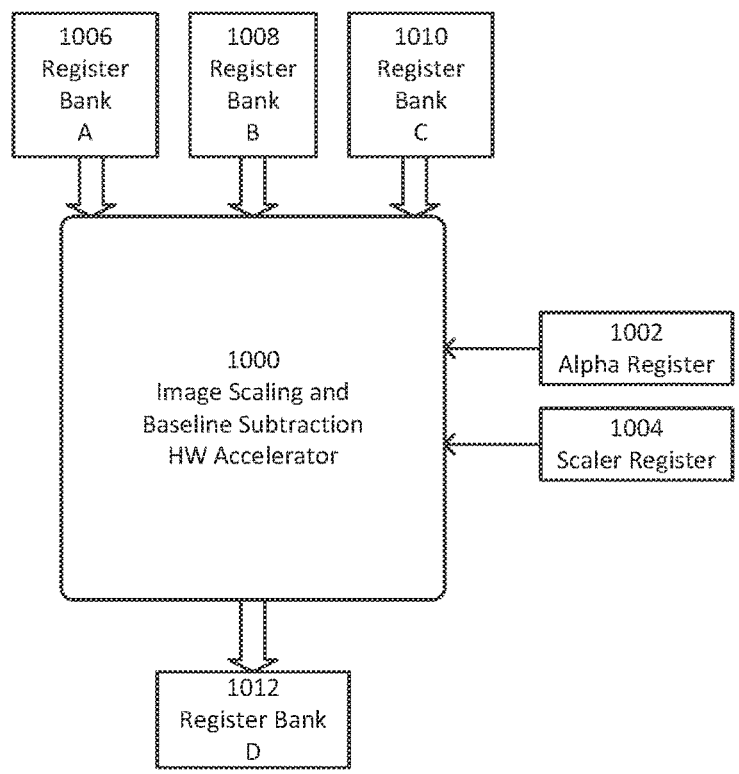
FIG. 10 illustrates an example block diagram for a hardware accelerator implementing an image scaling and baseline subtraction algorithm according to examples of the disclosure.

FIG. 10 illustrates an example block diagram for a hardware accelerator implementing an image scaling and baseline subtraction algorithm according to examples of the disclosure. A hardware accelerator 1000 implementing an image scaling and baseline subtraction algorithm can include as inputs an alpha gain parameter and a scaler parameter from alpha register 1002 and scaler register 1004, respectively. The algorithm can accept touch information from three different memory locations—register bank A 1006, register bank B 1008 and register bank C 1010, for example—which can map to one or more physical memory banks of the system. The signals necessary to access these memory locations (e.g., address signals, data signals, handshake signals, etc.) can be routed via hardware accelerator switching unit 906 to couple these memory locations as inputs for the hardware accelerator 1000 implementing an image scaling and baseline subtraction algorithm. Likewise, the output of the algorithm can be output to memory locations represented by register bank D 1012. The dynamic switching can allow the hardware algorithm to perform processing operations while reducing the amount of data movement. The hardware accelerator switching unit 906 can use a small enough transistor process that switching circuitry can add minimal capacitive loading with a small silicon area cost to reduce data movement. For each pixel in the two dimensional touch image, the hardware accelerator can use the inputs from register banks 1006, 1008 and 1010 to generate an output stored in register bank 1012. The output, D(i), can be generated based on the following equation: $D(i)=(alpha/scaler) \times (A(i)-B(i))+C(i)$, where alpha and scaler are the constants stored in the alpha register 1002 and scaler register 1004, respectively, A(i), B(i), C(i) and D(i) refer to the data read from or written to the memory for the algorithm for each pixel i.

Figure 11:
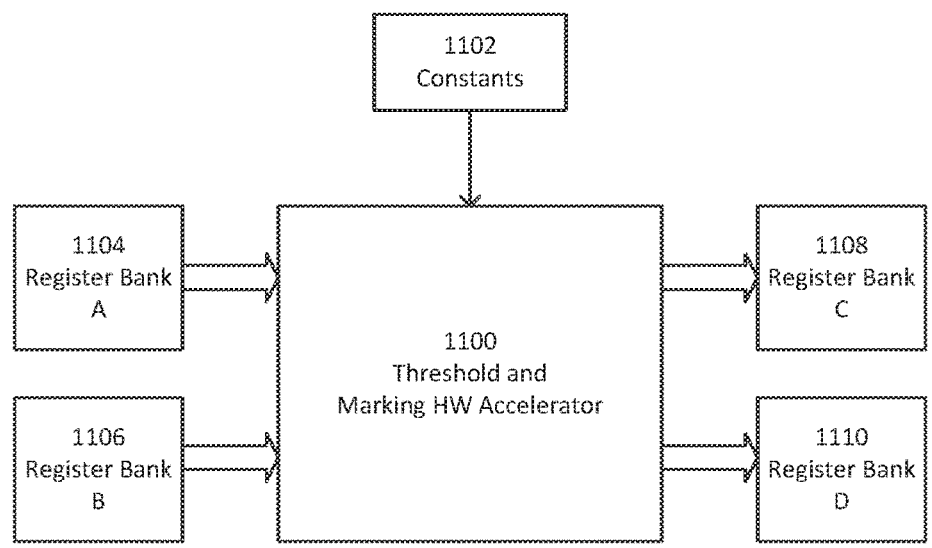
FIG. 11 illustrates an example block diagram for a hardware accelerator implementing a thresholding and marking algorithm according to examples of the disclosure.

FIG. 11 illustrates an example block diagram for a hardware accelerator implementing a thresholding and marking algorithm according to examples of the disclosure. A hardware accelerator 1100 implementing a thresholding and marking algorithm can include as inputs one or more constants (e.g., for thresholding and marking) stored for example in a register block 1102. The algorithm can include as inputs touch information from two different memory locations—register bank A 1104 and register bank B 1106, for example—which can map to one or more physical memory banks of the system. The signals lines necessary to access these memory locations (e.g., address signals, data signals, handshake signals, etc.) can be routed via hardware accelerator switching unit 906 to couple these memory locations as inputs for the hardware accelerator 1100 implementing the thresholding and marking algorithm. Likewise, the outputs of the algorithm can be output to memory locations represented by register bank C 1108 and register bank D 1110. The dynamic switching can allow the hardware algorithm to perform operations while reducing the amount of data movement. The hardware accelerator can use the inputs from the register banks 1104 and 1106 to generate the outputs stored in register banks 1108 and 1110. The thresholding and marking algorithm outputs can include a thresholded map (marking) and a thresholded image (subtracted). The output D(i) (i.e., thresholded image) can be generated for each pixel of the two dimensional image based on the following equation:

$$D(i) = \begin{cases} A(i) - \text{constant1}; & \text{if } ((A(i) - \text{constant1}) - \text{constant 2}) > 0 \\ 0; & \text{else} \end{cases}$$

where constants 1 and 2 can be stored in register block 1102 and A(i) and D(i) refer to the data read from or written to the memory for the algorithm. The output C(i) (i.e., thresholded map (marking)) can be generated by the logical expression:

$$C(i) = \overline{D(i) == 0} \text{ or} (B(i) < \text{constant3})$$

Where constant 3 can be stored in register block 1102 and B(i), C(i) and D(i) can refer to the data read from or written to the memory for the algorithm.

Figure 12:
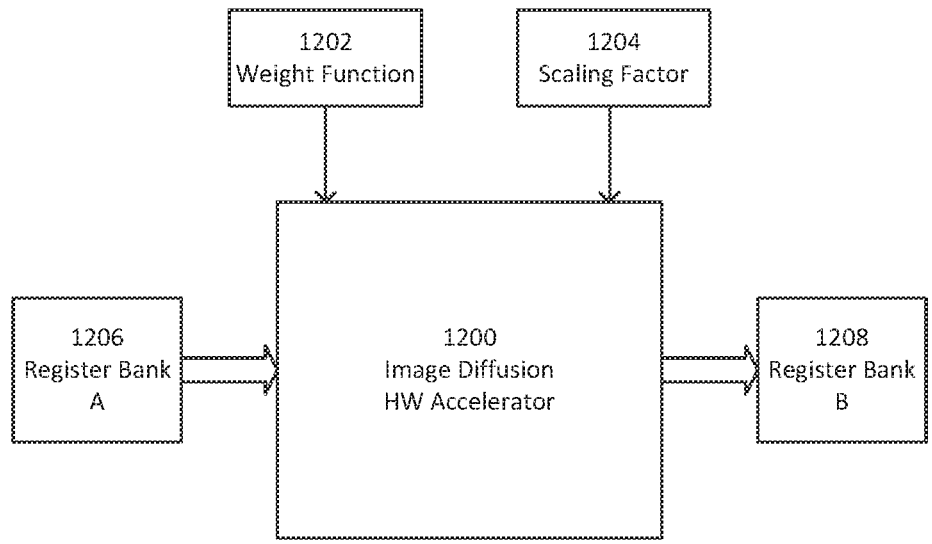
FIG. 12 illustrates an example block diagram for a hardware accelerator implementing an image diffusion algorithm according to examples of the disclosure.

FIG. 12 illustrates an example block diagram for a hardware accelerator implementing an image diffusion algorithm according to examples of the disclosure. A hardware accelerator 1200 implementing an image diffusion algorithm can include as inputs a weighting function and scaling factor stored in registers 1202 and 1204, respectively, for example. The algorithm can include touch information from one memory location—register bank A 1206, for example—which can map to one or more physical memory banks of the system. The signals lines necessary to access these memory locations (e.g., address signals, data signals, handshake signals, etc.) can be routed via hardware accelerator switching unit 906 to couple these memory locations as inputs for the hardware accelerator 1200 implementing an image diffusion algorithm. Likewise, the output of the algorithm can be output to memory location represented by register bank B 1208. The switching can allow the hardware algorithm to perform operations while reducing the amount of data movement. For each pixel in the two dimensional touch image, the hardware accelerator can use the inputs from the register bank 1206 to generate an output stored in register bank 1208. The output, B(i), can be generated based on the following equation:

$$B(i) = \frac{a_{11}w_{11} + a_{12}w_{12} + \ldots + a_{22}w_{22}}{\text{scaling factor}}$$

where $w_{jk}$ can correspond to weighting coefficients from register 1202, the scaling factor can correspond to the scaling factor from register 1204, $a_{jk}$ can correspond to the touch data value at A(i) and adjacent pixels, such that $a_{22}$ (center pixel) can corresponds with A(i), and B(i) can refer to the data written to the memory for the algorithm.

Figure 13:
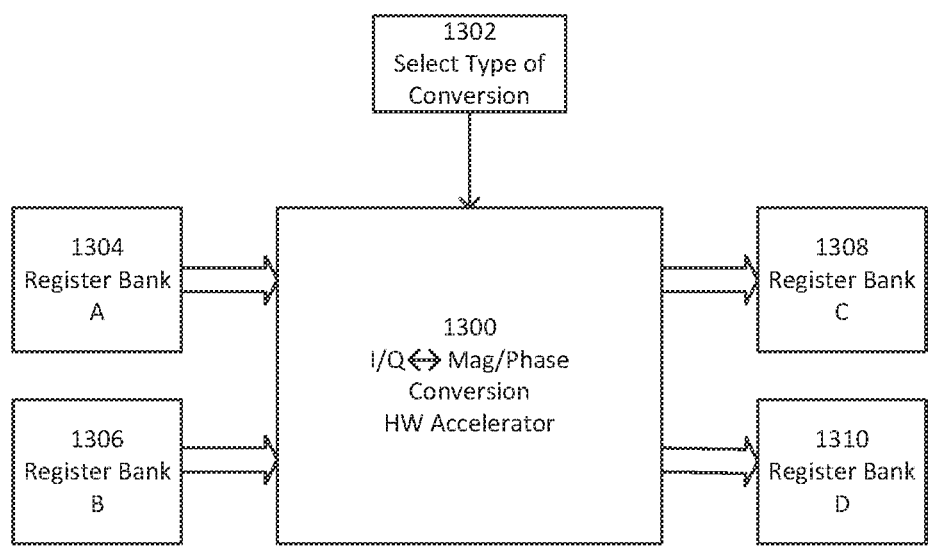
FIG. 13 illustrates an example block diagram for a hardware accelerator implementing an algorithm for conversion between magnitude and phase representation and in-phase and quadrature representation according to examples of the disclosure.

FIG. 13 illustrates an example block diagram for a hardware accelerator implementing an algorithm for conversion between magnitude and phase representation and in-phase and quadrature representation according to examples of the disclosure. A hardware accelerator 1300 implementing an algorithm for conversion between a magnitude and phase ("Mag/Phase") representation and an in-phase (I) and quadrature (Q) ("I/Q") representation can include a selection input 1302 indicating the direction of conversion (from I/Q to Mag/Phase or from Mag/Phase to I/Q). The algorithm can include touch information from two different memory locations—register bank A 1304 and register bank B 1306, for example—which can map to one or more physical memory banks of the system. The signals lines necessary to access these memory locations (e.g., address signals, data signals, handshake signals, etc.) can be routed via hardware accelerator switching unit 906 to couple these memory locations as inputs for the hardware accelerator 1300 implementing the conversion algorithm. Likewise, the outputs of the algorithm can be output to memory locations represented by register bank C 1308 and register bank D 1310. The dynamic switching can allow the hardware algorithm to perform operations while reducing the amount of data movement. The hardware accelerator can use the inputs from the register banks 1304 and 1306 to generate the outputs stored in register banks 1308 and 1310. The conversion algorithm outputs can include either I/Q representations or Mag/Phase representations depending on the direction of conversion. In some examples, depending on the direction of conversion, the input and outputs can be reversed (such that register banks 1308 and 1310 can be inputs and register banks 1304 and 1306 can be outputs. The outputs C(i) and D(i) when converting from I/Q to Mag/Phase can be generated based on the following equations:

$$C(i) = A(i) \cos(B(i))$$

$$D(i) = A(i) \sin(B(i))$$

where A(i), B(i), C(i) and D(i) refer to the data read from or written to the memory for the algorithm. The outputs C(i) and D(i) when converting from Mag/Phase to I/Q can be generated based on the following equations:

$$C(i) = \sqrt{A(i)^2 + B(i)^2}$$

$$D(i) = \arctan(A(i), B(i))$$

where A(i), B(i), C(i) and D(i) refer to the data read from or written to the memory for the algorithm.

The algorithms presented above can be representative, and more or fewer algorithms can be implemented with hardware accelerators. Additionally, although the register banks are labeled A through D, these representations are abstractions and simply refer to memory locations, not necessarily physical banks. The mapping between register banks A through D can be dynamically remapped to physical memory locations to minimize data transfers required to process touch data (e.g., via a hardware accelerator switching unit). In some examples, more than four register banks can be used to allow for hardware acceleration implementation of algorithms requiring more input and output register banks. Additionally, increasing the number of register banks can make it possible operate more than one hardware accelerator at a time.

In some examples, a touch controller circuit can include only one hardware accelerator of each algorithm type (e.g., one image distribution hardware accelerator per touch controller circuit). In other examples, a touch controller circuit can include one or more hardware accelerator of each algorithm type.

In some examples, the hardware accelerators can be sequenced by one of the one or more processors of the touch controller circuit. In other examples, the touch controller circuit including hardware accelerators can include a dedicated processor to sequence the hardware accelerator operations. For example, an on-chip sequencer (e.g., a state machine or programmable logic) can sequence the performance of processing operations by the one or more hardware accelerators. Sequencing the hardware accelerator processing can include specifying the inputs and outputs for the one or more hardware accelerators, providing timing (e.g., start and stop) for the processing operation, etc. This sequencing processor can include access to a dedicated local memory and the one or more of the memory banks of the RAM for the touch controller circuit. Sequencing the one or more hardware accelerators can include pipelining the input and output data using one or more buffers (e.g., and input and/or output buffer between the hardware accelerators and the memory. Additionally, in configurations using more than one touch controller circuit, the sequencer for each touch controller circuit can be synchronized through a dedicated set of synchronization signals that can be included in the touch controller circuit interface (discussed below in more detail). The sequencing function described herein can be part of the scan sequencer described in more detail below.

As discussed above, some touch sensitive devices can include one or more touch controller circuits (e.g., ASICs or chips) to perform sensing operations. In some examples, when the touch sensitive device includes more than one touch controller circuit, one of the touch controller circuits can act a master touch controller circuit and the remaining touch controller circuits can act as slave touch controller circuits. In order to coordinate and facilitate the sensing operations and processing performed by multiple touch controller circuits, a communication link and interface can be used to communicate between the multiple touch controller circuits.

The number of touch controller circuits used for a touch sensitive device can depend upon the size of the touch sensor panel (e.g., the number of individual pixel electrodes) and the number of receiving channels in each of the multiple touch controller circuits. In other words, the touch controller circuit can be designed with enough receiving channels for a small touch sensor panel, and as the size of the touch sensor panel increases, the number of touch controller circuits used can scale up according to the size of a touch sensor panel. As the number of touch controller circuits increases, each touch controller circuit can perform sensing or scanning operations on a portion of the touch sensor panel. Similarly, in some examples, the number of peripheral switching unit circuits/ASICs can scale with the number of touch controller circuits.

In touch sensitive devices including multiple touch controller circuits, processing of touch data generated from scanning operations from the multiple touch controller circuits can occur at a subset of the multiple touch controller circuits, for example at a master touch controller circuit, or alternatively, the processing can be distributed among the multiple touch controller circuits. In order to process the data at a master touch controller circuit, each of the slave touch controller circuits can transfer touch data generated from scanning operations to the master touch controller circuit and the master touch controller circuit can thereby store in memory touch data representative of the entire touch sensor panel (i.e., the entire image of touch) for processing. The master touch controller circuit can also transfer information after processing back to the slave touch controller circuits. In order to distribute the processing capability between the multiple touch controller circuits, each touch controller circuit can receive touch data from each of the remaining touch controller circuits (e.g., after each scanning step). Thus, each touch controller circuit can store in memory touch data representative of the entire touch sensor panel (i.e., the entire image of touch) and can process the touch data in parallel.

In some examples the data can be transferred between multiple touch controller circuits at the end of each scanning step. For example, if in a scanning step each touch controller circuit measures self-capacitance touch data for each receive channel of the touch controller circuit, at the conclusion of the scanning step, the touch data for each receive channel can be transferred to the remaining touch controller circuits (and each touch controller circuit can receive the corresponding touch data for the scanning step from the remaining touch controller circuits).

In some examples, each touch controller circuit can have two high speed ports (although in other examples, fewer or more high speed ports are possible). The ports can be used to couple together touch controller circuits. Because multiple ports can result in two memory access operations of the same location in memory of the touch controller circuit (e.g., two write operations to the same memory location), the touch controller circuit can include hardware, firmware or software to perform conflict resolution to prevent errors in transferring information on the two ports simultaneously.

Additionally, in order to properly map the touch data from the multiple touch controller circuits, information about the touch controller circuit can be transferred along with the touch data. For example, the information about the touch controller circuit can include a chip identifier (ID), which can be used to identify a touch controller circuit. For example, in a system having up to four touch controller circuits, the chip ID can be hardwired through two dedicated configuration pins. Each of the up to four touch controller circuits can be represented as "00", "01", "10" and "11". For systems including up to eight touch controller circuits, the chip ID can require an extra signal, pin or bit to properly distinguish between the up to eight touch controller circuits. The size of the chip ID can vary as the number of touch controller circuits increases.

Figure 14:
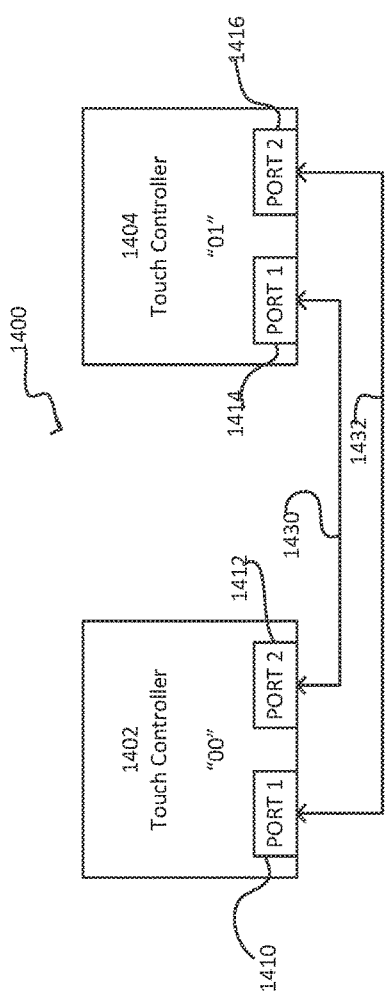
FIG. 14 illustrates an example touch sensing system including two touch controller circuits according to examples of the disclosure.

FIG. 14 illustrates an example touch sensing system including two touch controller circuits according to examples of the disclosure. Touch sensing system 1400 can include a first touch controller circuit 1402 and second touch controller circuit 1404. First touch controller circuit 1402 can act as the master touch controller circuit, and can include two high speed ports 1410 and 1412. Second touch controller circuit 1404 can act as the slave touch controller circuit, and can include two high speed ports 1414 and 1416. High speed port 1410 of the first touch controller circuit 1402 can be coupled to high speed port 1416 of the second touch controller circuit 1404 via communication link 1432. High speed port 1412 of the first touch controller circuit 1402 can be coupled to high speed port 1414 of the second touch controller circuit 1404 via communication link 1430. Each port can be capable of accepting or transmitting any necessary input/output signals, clock signals, control signals, synchronization signals and/or strobe signals for the interface between touch controller circuits. In the above configuration with two communication links between the two touch controller circuits, one communication link can be used for communications between the processors (or other processing circuitry) of different touch controller circuits, e.g., to transfer information between one or more processors in the first touch controller circuit 1402 and one or more processors of the second touch controller circuit 1404. The second communication link can be used as a high speed communication channel for the transfer of touch data from scanning operations between the first and second touch controller circuits.

In a configuration with two touch controller circuits, the touch sensing system can have a dedicated communication link for inter-circuit communication between processors and a dedicated communication link for transferring touch data between the two touch controller circuits. In other examples, each of the two communication links can be used to communicate touch data and/or other information between processors between the two touch controller circuits. In either case, the transfer of touch data can be accomplished in one step (e.g., touch data from the first touch controller circuit can be transferred to the second touch controller circuit, and touch data from the second touch controller circuit can be transferred to the first touch controller circuit).

Figure 15:
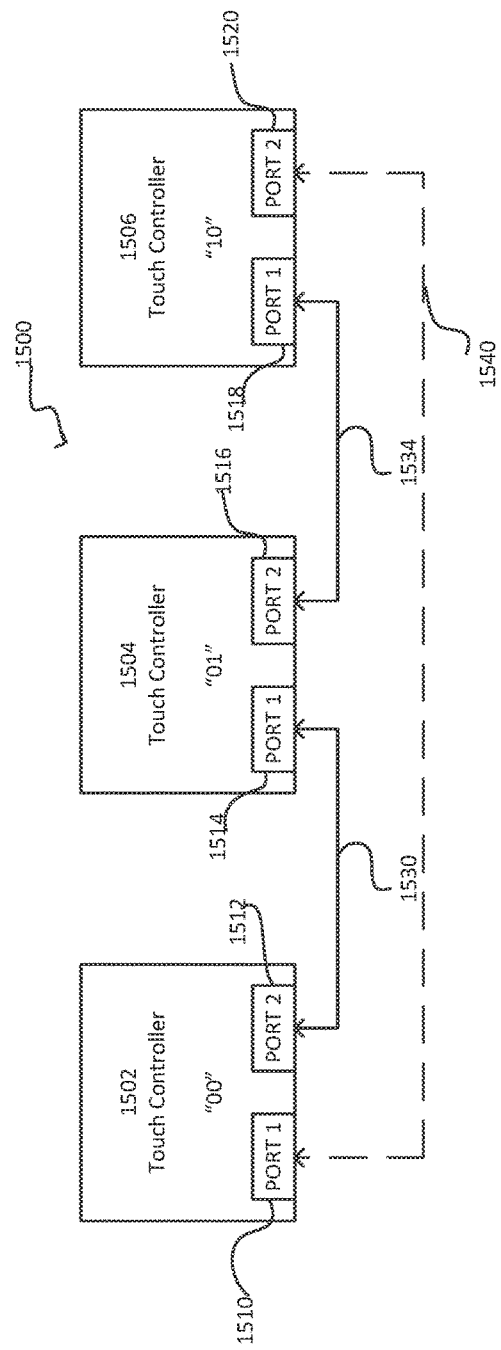
FIG. 15 illustrates an example touch sensing system including three touch controller circuits according to examples of the disclosure.

FIG. 15 illustrates an example touch sensing system including three touch controller circuits according to examples of the disclosure. Touch sensing system 1500 can include a first touch controller circuit 1502, a second touch controller circuit 1504, and a third touch controller circuit 1506. First touch controller circuit 1502 and third touch controller circuit 1506 can act as slave touch controller circuits, and can each include two high speed ports 1510 and 1512 and 1518 and 1520, respectively. Second touch controller circuit 1504 can act as a master touch controller circuit, and can include two high speed ports 1514 and 1516. High speed port 1512 of the first touch controller circuit 1502 can be coupled to high speed port 1514 of the second touch controller circuit 1504 via communication link 1530. High speed port 1516 of the second touch controller circuit 1504 can be coupled to high speed port 1518 of the third touch controller circuit 1506 via communication link 1534. Communication links 1530 and 1534 can be shared for touch data transfer or processor communication between the three touch controller circuits. When no touch data is being transferred, the communication link can operate at maximum speed. When touch data is being transferred between touch controller circuits, the communication link between the processors can operate at a reduced speed (compared with the maximum speed) to allow for parallel simultaneous communications of touch data and inter-processor information.

In the example of FIG. 15, transfer of touch data can be accomplished in two steps. During a first data transfer step, the second touch controller circuit (master) can receive touch data from the first touch controller circuit and touch data from the third touch controller circuit, and the first and third touch controller circuits can receive touch data from the second touch controller circuit. During a second data transfer step, the third touch controller circuit can receive touch data from the first touch controller circuit (having been previously transferred to the intermediate second touch controller circuit) and likewise, the first touch controller circuit can receive touch data from the third touch controller circuit (having been previously transferred to the intermediate second touch controller circuit). Thus, for a configuration with three touch controller circuits as shown in FIG. 15 two steps can be performed to transfer the touch data to each touch controller circuit.

Figure 16:
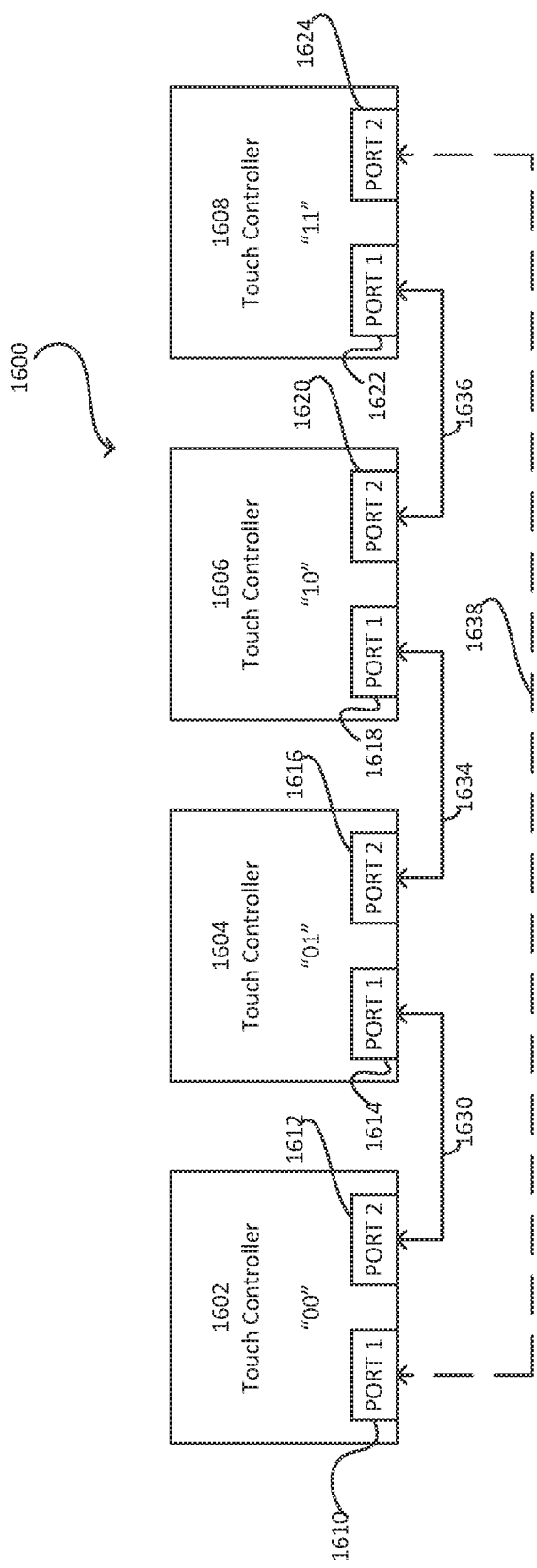
FIG. 16 illustrates an example touch sensing system including four touch controller circuits according to examples of the disclosure.

FIG. 16 illustrates an example touch sensing system including four touch controller circuits according to examples of the disclosure. Touch sensing system 1600 can include a first touch controller circuit 1602, a second touch controller circuit 1604, a third touch controller circuit 1606, and a fourth touch controller circuit 1608. First touch controller circuit 1602, third touch controller circuit 1606, and fourth touch controller circuit 1608 can act as slave touch controller circuits, and can each include two high speed ports 1610 and 1612, 1618 and 1620, and 1622 and 1624, respectively. Second touch controller circuit 1604 can act as a master touch controller circuit, and can include two high speed ports 1614 and 1616. High speed port 1612 of the first touch controller circuit 1602 can be coupled to high speed port 1614 of the second touch controller circuit 1604 via communication link 1630. High speed port 1616 of the second touch controller circuit 1604 can be coupled to high speed port 1618 of the third touch controller circuit 1606 via communication link 1634. High speed port 1620 of the third touch controller circuit 1606 can be coupled to high speed port 1622 of the fourth touch controller circuit 1608 via communication link 1636. Communication links 1630, 1634, and 1636 can be shared for touch data transfer or processor communication between the three touch controller circuits (the details of which are not repeated here for simplicity).

In the example of FIG. 16, transfer of touch data can be accomplished in three steps. During a first data transfer step, the second touch controller circuit (master) can receive touch data from the first touch controller circuit and touch data from the third touch controller circuit. Likewise, during the first data transfer step, the third touch controller circuit can receive touch data from the second and fourth touch controller circuits. The first and fourth touch controller circuits can receive touch data from the second and third touch controller circuits, respectively, during the first data transfer step. During a second data transfer step, the third touch controller circuit can receive touch data from the first touch controller circuit (having been previously transferred to the intermediate second touch controller circuit), the first touch controller circuit can receive touch data from the third touch controller circuit (having been previously transferred to the intermediate second touch controller circuit), the second touch controller circuit can receive touch data from the fourth touch controller circuit (having been previously transferred to the intermediate third touch controller circuit), and the fourth touch controller circuit can receive touch data from the second touch controller circuit (having been previously transferred to the intermediate third touch controller circuit). Thus, for a configuration with four touch controller circuits as shown in FIG. 16, three steps can be performed to transfer the touch data to each touch controller circuit.

In other configurations, the number of data transfer steps can be changed. For example, a ring configuration can be used to reduce the number of data transfer steps. As illustrated in FIG. 16, high speed port 1610 can be coupled to high speed port 1624 via communication link 1638. Communication link 1638 can be shared for touch data transfer or processor communication between the first and fourth touch controller circuits. In the example of FIG. 16, transfer of touch data can be accomplished in two steps instead of three steps. During a first data transfer step, the second touch controller circuit (master) and third touch controller circuit can receive the same touch data described above. Additionally, during the first data transfer step the first touch controller circuit can receive touch data from the second and fourth touch controller circuits, and the fourth touch controller circuit can receive touch data from the first and third touch controller circuits respectively. During a second data transfer step, each of the touch controller circuits can receive the remaining data from the non-adjacent touch controller circuit (e.g., via an intermediate data transfer between touch controller circuits in the first step). For example, the first touch controller circuit can receive touch data from the third touch controller circuit, the second touch controller circuit can receive touch data from the fourth touch controller circuit, the third touch controller circuit can receive touch data from the first touch controller circuit, and the fourth touch controller circuit can receive touch data from the second touch controller circuit. Thus, for a configuration with four touch controller circuits in a ring configuration, the number of data transfer steps can be reduced from three steps to two steps to transfer the touch data to each touch controller circuit for parallel processing.

Similarly, referring back to FIG. 15, communication link 1540 between high speed port 1510 and high speed port 1520 (i.e., ring configuration) can be used to reduce the number of data transfer steps for a touch sensing system having three touch controller circuits. Each touch controller circuit can receive touch information from the adjacent touch controller circuit so the number of data transfer steps can be reduced from two to one.

As discussed above, each touch controller circuit can store in memory touch data representative of the entire touch sensor panel (i.e., the entire image of touch) and can process the touch data in parallel using one or more processors and/or one or more hardware accelerators. The touch data can be received on a per-pixel basis (e.g., from scans by one or more touch controller circuits). For example, the sensed signals for each receive channel for each touch controller circuit (corresponding to specific pixels) can be received (for various scans and/or scan steps), processed (e.g., via one or more DSP channels) and the touch data can be stored in memory for subsequent processing (e.g., centroid calculation, etc.). The touch controller circuit can receive the per-pixel information and use a mapping function to keep track of the touch data accumulated from different touch controller circuits in order to properly recreate or reconstruct an image of touch for local processing. Additionally, or alternatively, this mapping can be accomplished by a look-up table (LUT). In order to map the memory locations to physical touch sensor panel electrodes, the touch data can include identifying information that can be used by the touch controller circuit to properly process and store the data. For example, the identifying information can include one or more of the following parameters: (1) touch controller chip ID, (2) channel number, (3) scan type, and (4) scan step number (or time). The above information can be used to identify a specific the physical pixel location within the touch sensor panel. With this information, the touch data collected from the plurality of touch controller circuits and copied to the other touch controller circuits can be used to create a complete image of touch for the touch sensor panel at each touch controller circuit. In the case that only one touch controller circuit is used, some of than the above information can be unnecessary for the mapping function (and the mapping function may be entirely unnecessary). The above described mapping capability can be performed by one or more processors in the touch controller circuit. Additionally or alternatively, the mapping can be done using a predefined map (e.g., as an equation or function of the parameters discussed above).

As discussed above, in some examples, the touch controller chip ID can be hardwired. In other examples, the chip ID can be set on at boot-up or reset, or dynamically adjusted during operation. Some or all of the remaining identifying information (e.g., scan type, scan step/time, etc.) can come from the scan sequencer, for example. In some examples, some or all of the identifying information (e.g., correspondence between the physical touch node and Rx channel) can come from the switching unit (e.g., switching unit 240) coupled between the touch controller chip and a touch sensor panel. This information can also come from the scan sequencer in some examples. The scan sequencer can be a part of the touch controller circuit (or can separate from the touch controller in other examples), and in some cases can be implemented as part of the panel scan engine.

Figure 20:
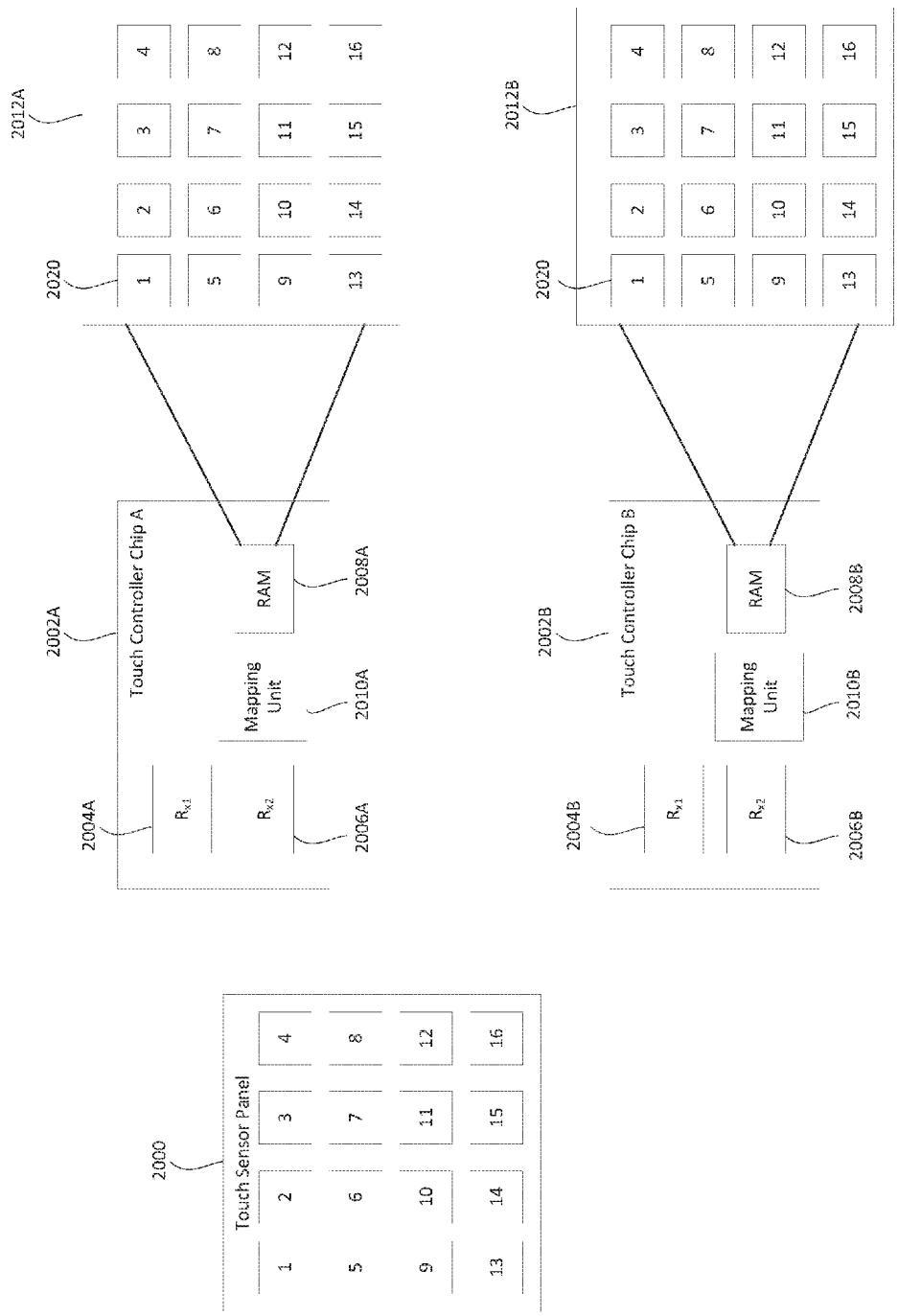
FIG. 20 illustrates an exemplary representation of mapping between physical touch sensor panel electrodes and memory locations according to examples of the disclosure.

FIG. 20 illustrates an exemplary representation of mapping between physical touch sensor panel electrodes and memory locations according to examples of the disclosure. In the example of FIG. 20, example touch sensor panel 2000 can include 16 touch nodes numbered 1 through 16, though the number of electrodes can be different for other examples. The number associated with each electrode can correspond to a physical location of the touch node in the touch sensor panel configuration. FIG. 20 also illustrates two example touch controller chips—Touch Controller Chip A 2002A and Touch Controller Chip B 2002B—that can correspond to the touch controller chips described above with reference to FIG. 2, for example. For ease of description, only RAM 2008AB and receive (Rx) channels 2004AB and 2006AB are illustrated. Each Rx channel can be coupled (e.g., by switching unit 240) to one or more electrodes during scanning operations to sense touch data. The mapping function performed by mapping units 2010A-B can respectively map the touch data from the Rx channels 2004A-B and 2006A-B to locations in memory 2008A-B to store the touch data. The mapping function performed by mapping units 2010A-B can be implemented using hardware, firmware, or software (e.g., programmable logic blocks, LUT, processor executing instructions for mapping that can be stored, for example, on a non-transitory computer readable storage medium, etc.). In some examples, the mapping unit can be implemented as part of the panel scan engine illustrated in FIG. 2.

The memory locations are illustrated in FIG. 20 by memory arrays 2012A-B including memory locations, such as memory location 2020, which are numbered 1 through 16 for illustration purposes corresponding to the physical location of touch nodes. Although illustrated in FIG. 20 as arranged in a specific pattern, the memory locations do not have to be stored in dedicated memory addresses or in a particular order, though they can be stored in continuous memory locations and/or in predetermined location and/or in a dedicated portion of the memory. In some examples, the memory locations allocated for touch nodes and scans can be predetermined. In some examples, the memory locations allocation for touch nodes and scans can be adjustable and/or selected during operation. In some examples, results from different scans can be stored in different portions of the memory. The mapping units 2010A can be configured to map the touch data received at Rx channels to the memory locations based, for example, on the identifying information. In some examples, the mapping unit for each touch controller chip can use the same memory locations and/or mapping function to store touch data (e.g., with the same identifying information) in the same place, though in other examples, touch controller chips can have different mappings to memory.

Figure 21A:
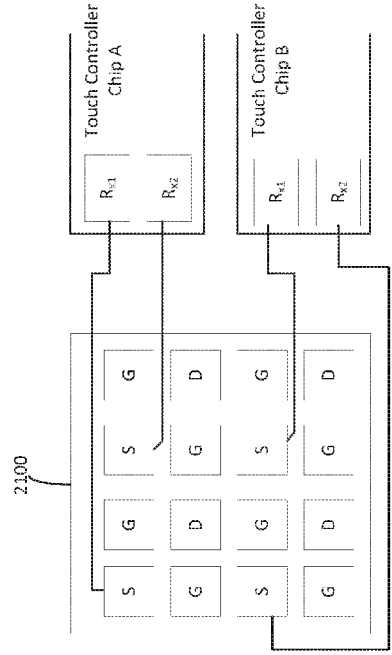
Figure 21B:
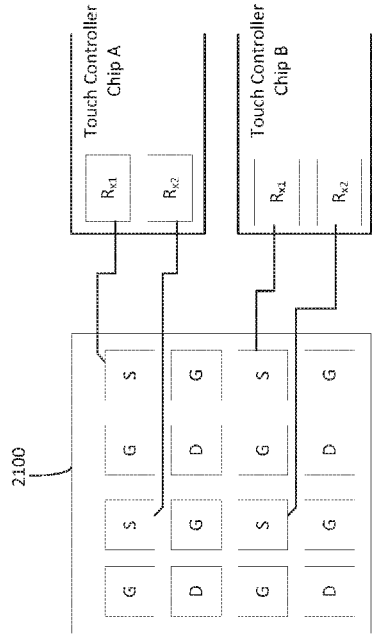
Figure 21C:
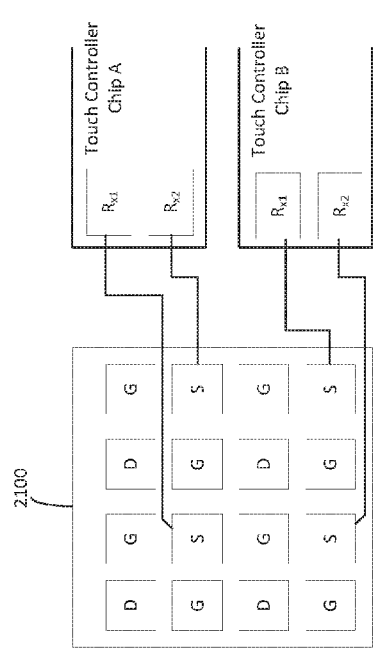
Figure 21D:
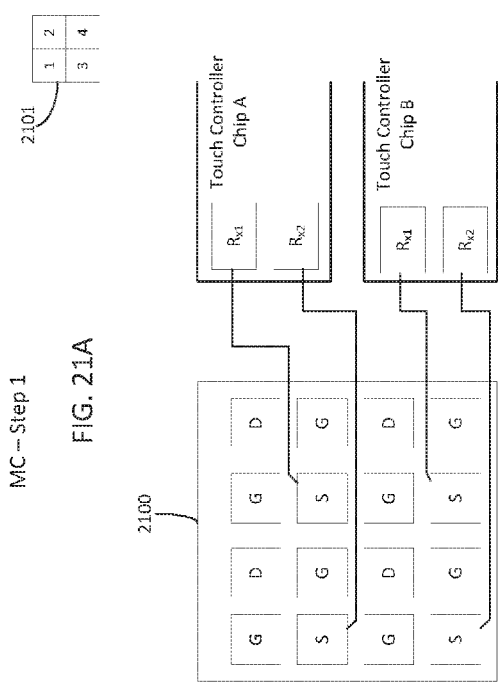

FIGS. 21A-21E illustrate an example mapping operation for a mutual capacitance scan according to examples of the disclosure. The example scan configuration illustrated in FIGS. 21-21E can correspond to scanning an example touch sensor panel 2100, using two touch controller chips, each touch controller chip including two Rx channels (e.g., corresponding to the configuration illustrated in FIG. 20). For ease of illustration and description, each of the four steps of the illustrated example mutual capacitance scan of touch sensor panel 2100 is shown in a different figure. FIG. 21A illustrates a first mutual capacitance scan step. FIG. 21A illustrates touch nodes in drive ("D"), sense ("S") and grounded/fixed voltage ("G") configurations. For ease of description, reference can be made to legend 2101 that can be representative of groups of four touch nodes in the touch sensor panel 2100. Referring to legend 2101 and the configuration of FIG. 21A, touch nodes in position 1 can be configured as drive nodes (e.g., coupled to a transmit section that can generate stimulation signals), touch nodes in position 2 and 3 can have a fixed voltage (e.g., grounded) and touch nodes in position 4 can be sensed (e.g., coupled to Rx channels). During the first mutual capacitance scan step, the drive nodes can be stimulated and mutual capacitance changes (between the position 1 touch nodes and position 4 touch nodes) can be sensed at the sense nodes. Thus, the first scan step illustrated in FIG. 21A can generate touch data for physical touch nodes 6, 8, 14 and 16 according to the numbering scheme of FIG. 20. During the second, third and fourth mutual capacitance scan steps, the configuration of D, G and S touch nodes can be rotated 90 degrees according to legend 2101, for example. Thus, in the second mutual capacitance scan step in FIG. 21B, touch nodes in position 3 can be sensed, in the third mutual capacitance scan step in FIG. 21C, touch nodes in position 1 can be sensed, and in the fourth mutual capacitance scan steps in FIG. 21D, touch nodes in position 2 can be sensed.

The touch data sensed during each scan step can be mapped to the memory based on the identifying information corresponding to the touch data. FIG. 21E illustrates an example table representing the mapping of touch data to memory locations according to examples of the disclosure. The table maps touch data using identifying information that can include (1) touch controller chip ID, (2) channel number, (3) scan type, and (4) scan step number (or time). For example, the touch data sensed at the second Rx channel (Rx2) of touch controller chip A during the second step of a mutual capacitance scan can correspond to physical touch node 5 in the numbering scheme of FIG. 20. The touch data can be stored in memory in a location corresponding to the touch data for this physical touch node (and scan type). As another example, the touch data sensed at the first Rx channel (Rx1) of touch controller chip B during the third step of a mutual capacitance scan can correspond to physical touch node 11 in the numbering scheme of FIG. 20 and can be stored in memory in a location corresponding to the touch data for this physical touch node (and scan type).

FIGS. 22A-22E illustrate an example mapping operation for a self-capacitance scan according to examples of the disclosure. The example scan configuration illustrated in FIGS. 22-22E can correspond to scanning an example touch sensor panel 2200 using two touch controller chips, each touch controller chip including two Rx channels (e.g., corresponding to the configuration illustrated in FIG. 20). For ease of illustration, each of the four steps of the illustrated example self-capacitance scan of touch sensor panel 2200 is shown in a different figure. FIG. 22A illustrates a first self-capacitance scan step (e.g., a fully boot-strapped self-capacitance scan). FIG. 22A illustrates touch nodes in drive ("D") and drive/sense ("D/S") configurations. During the first step of the illustrated scan, the drive nodes can be stimulated and the drive/sense nodes can be driven and sensed. Thus, the first scan step can generate touch data for physical touch nodes 4, 7, 12 and 14 according to the numbering scheme of FIG. 20. During the second, third and fourth self-capacitance scan steps, other touch nodes can be sensed. Thus, in the second self-capacitance scan step in FIG. 22B, physical touch nodes 3, 8, 11 and 15 can be sensed, in the third self-capacitance scan step in FIG. 22C, physical touch nodes 1, 6, 10 and 13 can be sensed, and in the fourth self-capacitance scan steps in FIG. 22D, physical touch nodes 2, 5, 9 and 16 can be sensed.

The touch data sensed during each scan step can be mapped to the memory based on the identifying information corresponding to the touch data. FIG. 22E illustrates an example table representing the mapping of touch data to memory locations according to examples of the disclosure. The table maps touch data using identifying information that can include (1) touch controller chip ID, (2) channel number, (3) scan type, and (4) scan step number (or time). For example, the touch data sensed at the first Rx channel (Rx1) of touch controller chip A during the first step of a self-capacitance scan can correspond to physical touch node 4 in the numbering scheme of FIG. 20. The touch data can be stored in memory in a location corresponding to the touch data for this physical touch node (and scan type). As another example, the touch data sensed at the second Rx channel (Rx2) of touch controller chip B during the fourth step of a self-capacitance scan can correspond to physical touch node 16 in the numbering scheme of FIG. 20 and can be stored in memory in a location corresponding to the touch data for this physical touch node (and scan type).

It should be understood that the mutual capacitance and self-capacitance scans and mapping described in FIGS. 21-21E and 22A-22E are exemplary and other scan configurations and mappings are possible. For example, the scan steps can be performed in a different order and different touch nodes can be scanned during different steps than illustrated. Additionally, a different number of touch nodes, receive channels and/or touch controller chips can be used, which can change the scanning operations (configurations and number of steps) and mapping operations.

For the example mapping described with respect to FIGS. 20, 21A-21E and 22A 22E, the image of touch can be reconstructed based on the touch data and corresponding physical location of the touch node. For example, the processing circuitry can access touch data stored at memory locations corresponding to the physical touch nodes and process the data accordingly. In other examples, rather than mapping the data to dedicated memory location, the touch data can be stored in memory along with some or all of the identifying information. In such examples, the mapping function can be performed during processing of the data stored in memory (e.g., rather than mapping before storing the data in memory).

As discussed herein, the touch controller chips can transfer touch data to other touch controller chips such that each touch controller chip can store touch data forming an image of touch. In some examples, the data transferred can include the identifying information (e.g., touch controller chip ID, channel number, scan type, and scan step number/time), which can be used by the memory mapping unit of the touch controller receiving the data to store the transferred touch data in the correct location. In other examples, different information can be transferred. For example, the touch data, chip ID and physical touch node location (e.g., without the scan type and scan step) can be transferred and a different mapping function (e.g., implemented by mapping unit 2010A-B or another mapping unit) can map the transferred touch data to memory.

Figure 17:
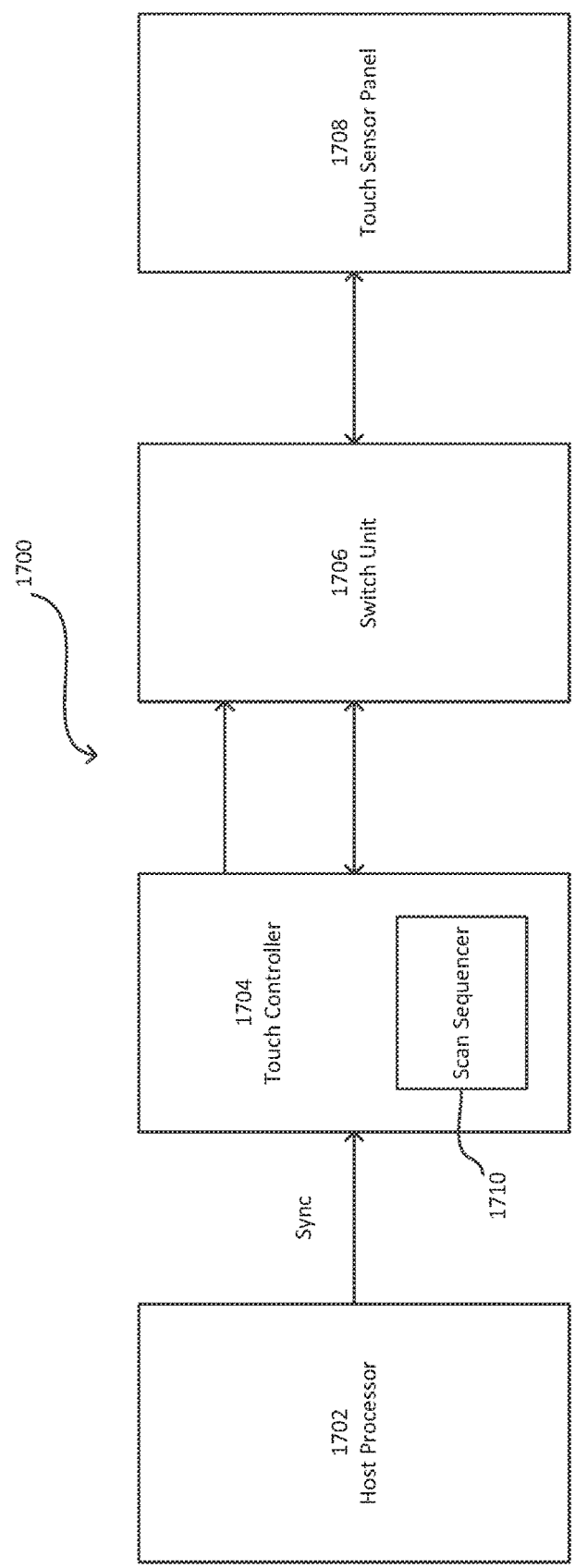
FIG. 17 illustrates an example computing system for sequencing scanning operations according to the examples of the disclosure.

FIG. 17 illustrates an example computing system for sequencing scanning operations according to the examples of the disclosure. FIG. 17 illustrates computing system 1700 which can include a host processor 1702, one or more touch controller circuits 1704, a peripheral switching unit 1706 (that can include one or more switching ASICs), and a touch sensor panel 1708 (or a touch screen). Scan sequencer 1710 can be implemented in each of the one or more touch controller circuits 1704. Host processor 1702 can generate synchronization signals that can be transmitted to the one or more touch controller circuits 1704. In other examples, the synchronization signals can also be transmitted to the one or more touch controller circuits 1704, via a display controller (not shown). Additionally, as discussed above, the scan sequencer of a touch controller circuit can also receive synchronization signals transmitted to or between more than one touch controller circuit. The scan sequencer 1710 can receive the synchronization signals and can decode or otherwise use the synchronization signals to determine the appropriate scanning functionality to be implemented at a given time (i.e., execution of a scan plan). In some examples, the synchronization signals can be decoded to identify whether and/or when a display can be performing a display refresh or an intra-frame pause (IFP). Performing some sensing and scanning operations during IFPs can improve performance because the interference from display refresh operations can be reduced during IFPs. Thus, the synchronization signals can be used by the scan sequencer 1710 to configure and/or execute one or more scanning operations including partial or complete sensing and scanning operations. Executing the one or more scans can include starting and stopping scans. Additionally, in some examples, the scan sequencer can also have access to additional information regarding the relative length and spacing of IFPs in a display frame in order to properly sequence the scans.

The scan sequencer can also perform the memory mapping discussed above to properly store touch data in the memory of the touch controller circuit based on information including chip ID, scan type, scan step and channel number.

Figure 18:
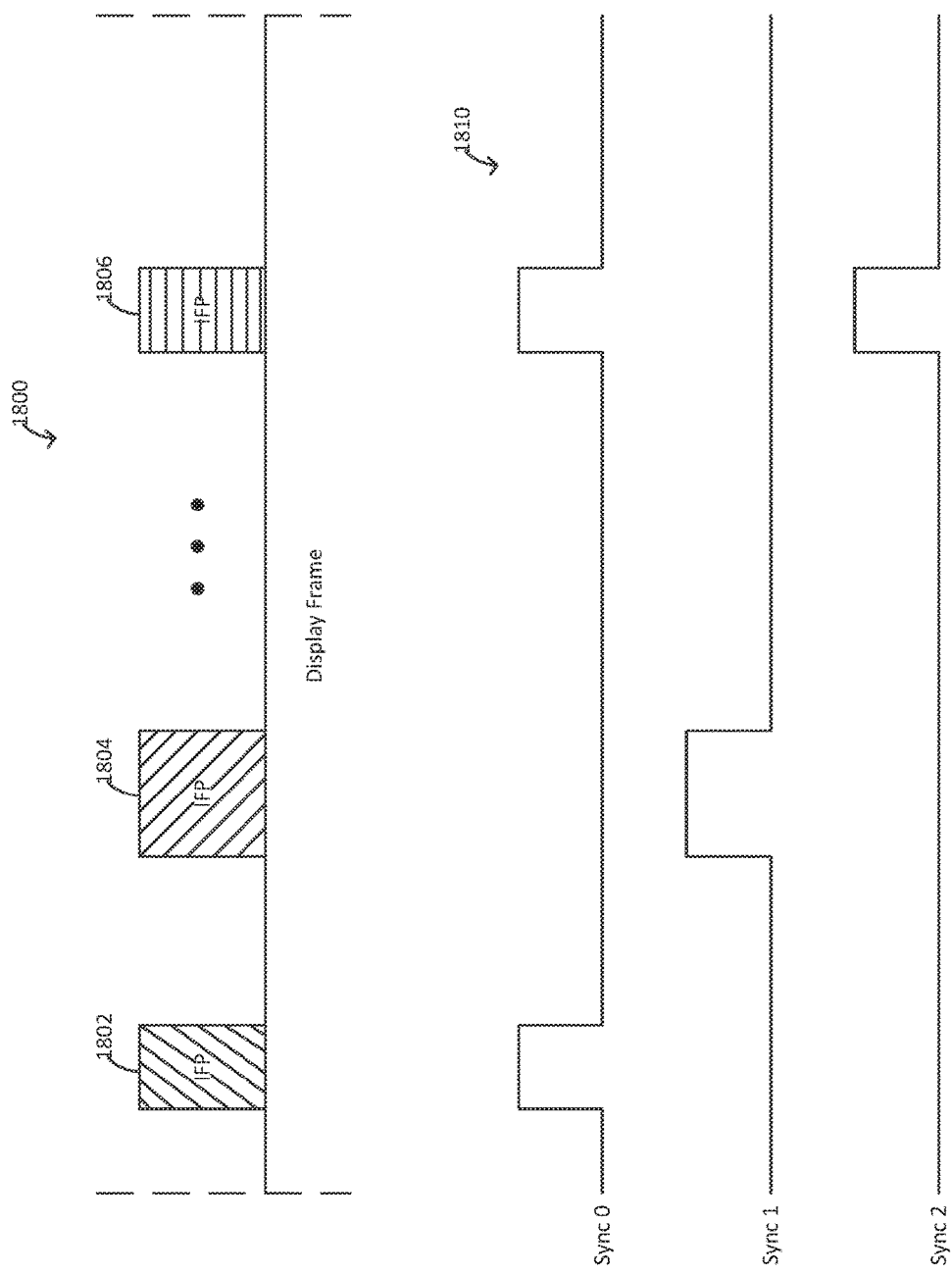
FIG. 18 illustrates an example timing diagram for intra-frame pauses in a display frame and synchronization signals according to examples of the disclosure.

FIG. 18 illustrates an example timing diagram for intra-frame pauses in a display frame and synchronization signals according to examples of the disclosure. Timing diagram 1800 shows a display frame, including one or more IFPs, at which time the display can be in a blanking period (vertical and/or horizontal blanking), for example. During the remaining portions of the display frame, the display can be performing an active display refresh which can cause interference with some scanning or sensing operations. As a result, the scan sequencer causes sensing or scanning operations to be performed in light of the state of the display operation (e.g., IFP or Display Refresh). The synchronization signals generated by the host processor can provide information to the scan sequencer about the operating mode of the display. For example, timing diagram 1810 includes three synchronization signals. When SYNC0 is high and SYNC1 and SYNC2 are low, the scan sequencer can identify IFP 1802. Likewise, when SYNC1 is high and SYNC0 and SYNC2 are low, the scan sequencer can identify IFP 1804. Similarly, when SYNC0 and SYNC2 are high and SYNC1 is low, the scan sequencer can identify IFP 1806. The meaning of the synchronization signals combinations illustrated in FIG. 18 is for purposes of example. Fewer or more synchronization signals can be used and the information encoded in the synchronization signals to indicate IFPs can be different than shown.

Returning to FIG. 17, scan sequencer 1710 can control the operation of switching unit 1706 (peripheral switching unit). The operation of switching unit 1706 can be based on the decoding of synchronization signals as well as on the scan plan (e.g., what scan or step of a scan is to be executed). In some examples, scan sequencer 1710 can cause a major reprogramming of the switching unit 1706. For example, when transitioning between scan types that require major reconfigurations of the coupling between the one or more touch controller circuits and the touch sensor panel (e.g., from a mutual capacitance row-to-column scan (i.e., driving rows and sensing columns) to a stylus/pen scan (i.e., sensing both rows and columns)), the scan sequencer can transmit (e.g., via an SPI or I2C channel) instructions to reconfigure the switching unit 1706 to configure the coupling for the upcoming sensing or scanning operation.

Additionally or alternatively, scan sequencer 1710 can transmit other information to cause the switch to make minor adjustments. For example, when walking through a plurality of steps of a scan, the scan sequencer can update which pixel is coupled to the receive channel without having to reconfigure the switching unit 1706 entirely. For example, when walking through the steps of a self-capacitance scan, each receive channel can be used to scan a plurality of electrodes, one electrode per step. As a result the signals from the scan sequencer can indicate a new step or a new pixel and the switching circuit can update the coupling to scan the appropriate pixel based on the information (e.g., the scan step). The minor adjustments to switching unit 1706 can also occur during steps of other sensing or scanning operations than self-capacitance scans.

The scans performed by a touch sensing system can include one or more of: a mutual capacitance row-to-column or column-to-row scan, a mutual capacitance row-to-row scan, a mutual capacitance column-to-column scan, a self-capacitance row scan, a self-capacitance column scan, a stylus scan (e.g., to sense an active stylus), a stylus spectral analysis scan, and a touch spectral analysis scan, although it is to be understood that other scan events can also be performed and that some scan events can be performed in a number of steps.

Figure 19:
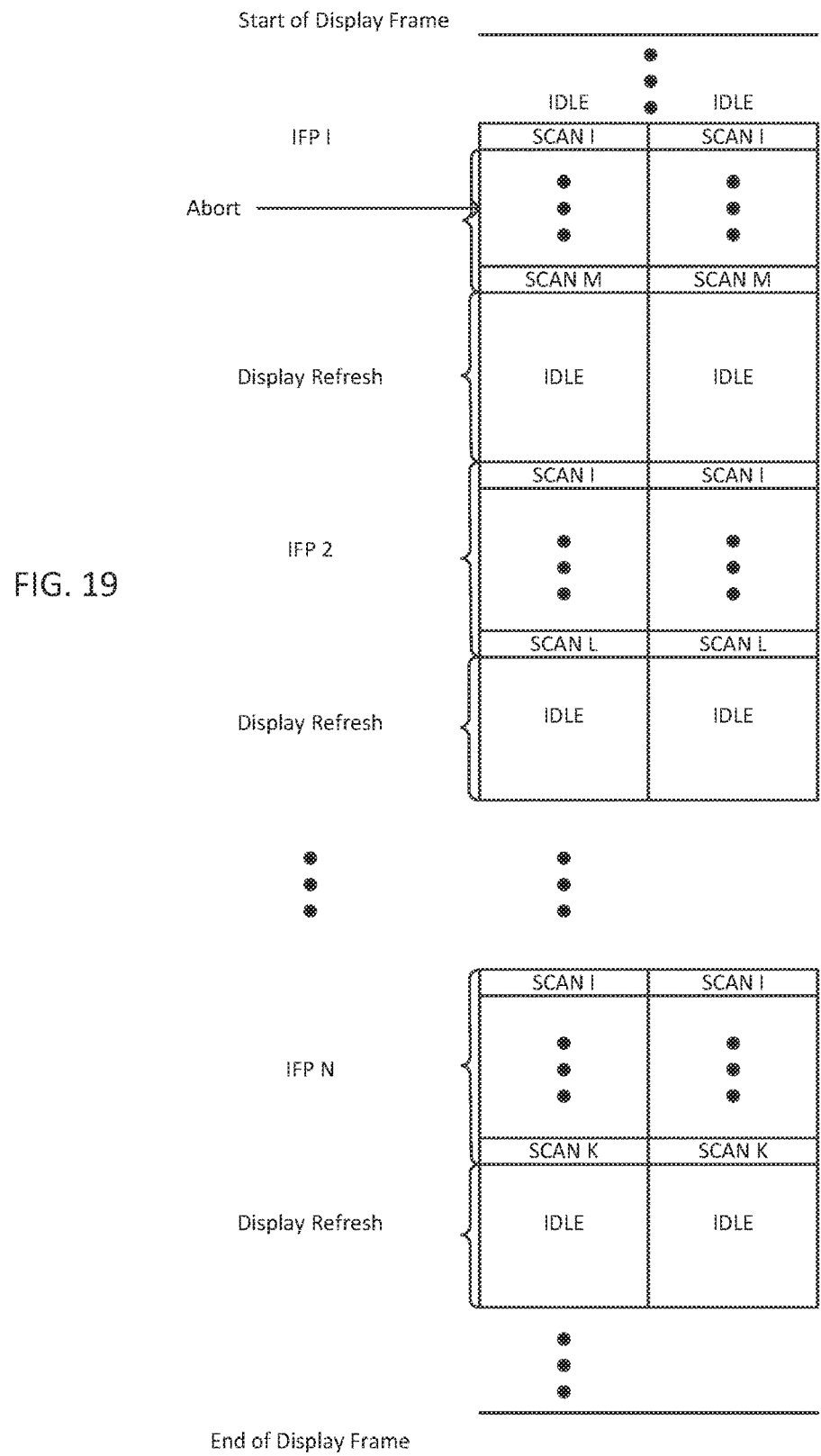
FIG. 19 illustrates an example of scanning operations during a display period that can be controlled by a scan sequencer according to examples of the disclosure.

FIG. 19 illustrates an example of scanning operations during a display period that can be controlled by a scan sequencer according to examples of the disclosure. As discussed above, during periods of active display refresh, interference from the display can degrade scanning performance. Accordingly, during display refresh periods, the scan sequencer can idle (i.e., not perform a scan). During the first IFP, the scan sequencer can execute M scans, during a second IFP, the scan sequencer can execute L scans, and during an Nth IFP, the scan sequencer can execute K scans. The scans performed during each of the IFPs can correspond to part of or a complete one of the one or more scan discussed above. Additionally, depending on the number of DSP channels for a sense channel, the sensed signals can be processed in parallel to perform simultaneous scans. For example, there can be N DSP channels (illustrated by additional columns in FIG. 19) to perform concurrent or partially concurrent scans. For example, the scan sequencer can cause the touch controller circuit to execute a mutual capacitance scan and also perform a mutual capacitance spectral analysis of the received touch data. Additionally or alternatively, the scan sequencer can cause the touch controller circuit to execute a self-capacitance scan and also perform a stylus/pen spectral analysis scan of the received touch data.

In some examples, the sequence of scans in a scan plan for a first IFP in a display frame can include a coarse scan used to coarsely detect touch events. After the coarse scan, additional scans in the first IFP or in subsequent IFPs can be performed. In some examples, if after performing the coarse detection scans no touch events are detected (or some other conditions are detected), the touch controller circuit can generate an abort command and the scan sequencer can abort one or more scans from the first IFP and/or one or more scans from the remaining IFPs. Additionally, one or more of the IFPs can include a coarse scan, the results from which can be used to generate abort commands for one or more subsequent scans during one or more IFPs.

Therefore, according to the above, some examples of the disclosure are directed to an integrated circuit. The integrated circuit can comprise a receive section including a plurality of receive channels configured to receive signals from sensing operations, a memory configured to store data based on the signals from the receive section, and a plurality of processing circuits. At least two of the plurality of processing circuits can be configured to directly access the memory. One or more of the plurality of processing circuits can be configured to process the data stored in memory. Additionally or alternatively to one or more of the examples disclosed above, in some examples, the integrated circuit can further comprise a switching unit coupled between the memory and at least one of the plurality of processing circuits. The switching unit can be configured to dynamically couple one or more banks of the memory to one or more inputs or one or more outputs of the one or more of the plurality of processing circuits. Additionally or alternatively to one or more of the examples disclosed above, in some examples, the switching unit can be coupled between the memory and at least one hardware accelerator. The switching unit can be configured to dynamically couple one or more banks of the memory to one or more inputs or one or more outputs of the at least one hardware accelerator circuit. Additionally or alternatively to one or more of the examples disclosed above, in some examples, the memory can include a plurality of access ports for simultaneous direct access of the memory by one or more of the plurality of processing circuits. Additionally or alternatively to one or more of the examples disclosed above, in some examples, the plurality of processing circuits can include one or more hardware accelerators configured to process the data stored in the memory. Additionally or alternatively to one or more of the examples disclosed above, in some examples, at least one of the plurality of processing circuits is configured to sequence the processing of the data stored in memory by the one or more of the plurality of processing circuits. Additionally or alternatively to one or more of the examples disclosed above, in some examples, sequencing the processing of the data stored in memory can include distributing the processing of one or more algorithms between the one or more of the plurality of processing circuits. Additionally or alternatively to one or more of the examples disclosed above, in some examples, the one or more hardware accelerators can include a first hardware accelerator to perform one or more of scaling the data stored in memory, subtracting a baseline amount from the data stored in memory, and adding or subtracting an offset to the data stored in memory. Additionally or alternatively to one or more of the examples disclosed above, in some examples, the one or more hardware accelerators can include a first hardware accelerator to generate a mapping of pixel locations with signals above a threshold and below a threshold. Additionally or alternatively to one or more of the examples disclosed above, in some examples, the one or more hardware accelerators can include a first hardware accelerator to perform an image diffusion algorithm. Additionally or alternatively to one or more of the examples disclosed above, in some examples, the one or more hardware accelerators can include a first hardware accelerator configured to convert data represented by a magnitude component and a phase component into data represented by an in-phase component and a quadrature component, or to convert data represented by the in-phase component and the quadrature component a magnitude component into data represented by the magnitude component and the phase component. Additionally or alternatively to one or more of the examples disclosed above, in some examples, the integrated circuit can further comprise an interface with one or more ports for transmitting first touch signals to, or receiving second touch signals from, another integrated circuit. Additionally or alternatively to one or more of the examples disclosed above, in some examples, at least one processing circuit of the plurality of processing circuits can be configured to generate an image of touch from the signals received by receive section or data stored in memory based on one or more parameters associated with the signals or data. The parameters can include one or more of a chip identifier, a scan step, a scan type and a receive channel number. Additionally or alternatively to one or more of the examples disclosed above, in some examples, at least one processing circuit of the plurality of processing circuits can be configured to map information associated with the signals or data stored in memory to physical pixel locations in order to generate the image of touch.

Some examples of the disclosure are directed to an apparatus (or a system). The apparatus can comprise a touch sensor panel, a plurality of touch controller integrated circuits, and a plurality of switching circuits coupled between the plurality of touch controller integrated circuits and the touch sensor panel. Additionally or alternatively to one or more of the examples disclosed above, in some examples, each touch controller integrated circuit can be coupled to a plurality of switching circuits. Additionally or alternatively to one or more of the examples disclosed above, in some examples, the one or more of the plurality of touch controller integrated circuits can include a receive section including a plurality of receive channels configured to receive signals from sensing operations, a memory configured to store data based on the signals from the receive section, and a plurality of processing circuits. At least two of the plurality of processing circuits can be configured to directly access the memory. One or more of the plurality of processing circuits can be configured to process the data stored in memory. Additionally or alternatively to one or more of the examples disclosed above, in some examples, one or more of the plurality of touch controller integrated circuits can further include a switching unit coupled between the memory and at least one of the plurality of processing circuits. The switching unit can be configured to dynamically couple one or more banks of the memory to one or more inputs or one or more outputs of the one or more of the plurality of processing circuits. Additionally or alternatively to one or more of the examples disclosed above, in some examples, the switching unit can be coupled between the memory and at least one hardware accelerator. The switching unit can be configured to dynamically couple one or more banks of the memory to one or more inputs or one or more outputs of the at least one hardware accelerator circuit. Additionally or alternatively to one or more of the examples disclosed above, in some examples, the memory of one or more of the plurality of touch controller integrated circuits can include a plurality of access ports for simultaneous direct access of the memory by one or more of the plurality of processing circuits. Additionally or alternatively to one or more of the examples disclosed above, in some examples, one or more of the plurality of touch controller integrated circuits can further include one or more hardware accelerator configured to process the data stored in the memory. Additionally or alternatively to one or more of the examples disclosed above, in some examples, at least one of the plurality of processing circuits of the one or more of the plurality of touch controller circuits can be configured to sequence the processing of the data stored in memory by the one or more of the plurality of processing circuits. Additionally or alternatively to one or more of the examples disclosed above, in some examples, sequencing the processing of the data stored in memory can include distributing the processing of one or more algorithms between the one or more of the plurality of processing circuits. Additionally or alternatively to one or more of the examples disclosed above, in some examples, the plurality of touch controller integrated circuits can include an interface with one or more ports for transmitting signals to or receiving signals from another touch controller integrated circuit. Additionally or alternatively to one or more of the examples disclosed above, in some examples, each of the plurality of touch controller integrated circuits can be coupled to one or more of the other touch controller integrated circuits in a daisy chain configuration. Additionally or alternatively to one or more of the examples disclosed above, in some examples, each of the plurality of touch controller integrated circuits can be coupled to another two touch controller integrated circuits in a daisy chain with a ring configuration. Additionally or alternatively to one or more of the examples disclosed above, in some examples, each of the plurality of touch controller integrated circuits can perform one or more scan steps and the data stored in memory based on the received signals can be transferred to each of the plurality of touch controllers such that each touch controller can store in memory the data from the plurality of touch controllers. Additionally or alternatively to one or more of the examples disclosed above, in some examples, at least one processing circuit of the plurality of processing circuits in each of the plurality of touch controller integrated circuits can be configured to generate an image of touch from data received from execution of one or more scans of the touch sensor panel based on one or more parameters associated with the signals. The parameters can include one or more of a chip identifier, a scan step, a scan type and a receive channel number. Additionally or alternatively to one or more of the examples disclosed above, in some examples, the at least one processing circuit of the plurality of processing circuits can be configured to map information associated with the signals or data stored in memory to physical pixel locations of the touch sensor panel in order to generate the image of touch. Additionally or alternatively to one or more of the examples disclosed above, in some examples, the sensing operations can include a stylus scan to sense stimulation signals generated by an active stylus.

Some examples of the disclosure are directed to a method for performing sensing scans for a touch-sensitive device. The method can comprise receiving synchronization signals, decoding the synchronization signals, and configuring a touch controller for performing the sensing scans based on the decoded synchronization signals. Additionally or alternatively to one or more of the examples disclosed above, in some examples, the synchronization signals can be received from one or more of a host processor and a display controller. Additionally or alternatively to one or more of the examples disclosed above, in some examples, the method can further comprise identifying a period of display operation corresponding to an intra-frame pause based on the decoded synchronization signal. Additionally or alternatively to one or more of the examples disclosed above, in some examples, the method can further comprise generating signals for reprogramming a switching unit based on the decoded synchronization signals and a scan plan. Additionally or alternatively to one or more of the examples disclosed above, in some examples, the method can further comprise generating signals for adjusting a coupling of a switching unit based on a sensing scan step. Additionally or alternatively to one or more of the examples disclosed above, in some examples, the method can further comprise generating signals for reprogramming or adjusting a coupling of the switching unit based on the decoded synchronization signals and output from processing touch data of one or more scans. Additionally or alternatively to one or more of the examples disclosed above, in some examples, the method can further comprise processing the data at each of the plurality of touch controller integrated circuits to generate an image of touch from the execution of one or more scans of the touch sensor panel. Additionally or alternatively to one or more of the examples disclosed above, in some examples, the method can further comprise aborting one or more scans based on results from one or more scans performed by the touch controller. Some examples of the disclosure are directed to an electronic device with a touch-sensitive display that can be configured to perform the method of any of the examples disclosed above. Some examples of the disclosure are directed to a computer program having instructions which when executed by an electronic device with a touch-sensitive display can cause the electronic device to perform the method of any of the examples disclosed above. Some examples of the disclosure are directed to a computer readable medium having stored thereon a computer program according any of the examples disclosed above. Some examples of the disclosure are directed to a non-transitory computer readable storage medium. The computer readable medium can contain instructions that, when executed by a processor, can perform the method of any of the examples disclosed above.

Some examples of the disclosure are directed to an apparatus for sequencing sensing scans. The apparatus can comprise a receive section including one or more sense channels and logic configured to decode synchronization signals, configure the receive section to perform a scan based on the decoded synchronization signals, and perform the scan. Additionally or alternatively to one or more of the examples disclosed above, in some examples, the apparatus can further comprise at least one of a host processor and a display controller. The synchronization signals can be received from the one or more of the host processor and the display controller. Additionally or alternatively to one or more of the examples disclosed above, in some examples, the logic can be further configured to identify a period of display operation corresponding to an intra-frame pause based on the decoded synchronization signal. Additionally or alternatively to one or more of the examples disclosed above, in some examples, the logic can further configured to generate signals for reprograming a switching unit based on the decoded synchronization signals and a scan plan. Additionally or alternatively to one or more of the examples disclosed above, in some examples, the logic can be further configured to generate signals for adjusting a coupling of a switching unit based on a sensing scan step. Additionally or alternatively to one or more of the examples disclosed above, in some examples, the logic can be further configured to generate signals for reprogramming or adjusting a coupling of the switching unit based on the decoded synchronization signals and output from processing touch data of one or more scans. Additionally or alternatively to one or more of the examples disclosed above, in some examples, the logic can be further configured to abort one or more scans based on results from the performed scan.

Some examples of the disclosure are directed to an integrated circuit. The integrated circuit can comprise means for receiving signals from sensing operations, means for storing data based on the received signals; and a plurality of processing means. At least two of the plurality of processing means can be configured to directly access the storing means. At least one of the plurality of processing means can be configured to process the stored data. Additionally or alternatively to one or more of the examples disclosed above, in some examples, the integrated circuit can further comprise switching means coupled between the storing means and at least one of the plurality of processing means. The switching means can be configured to dynamically couple one or more portions of the storing means to one or more inputs or one or more outputs of the at least one of the plurality of processing means. Additionally or alternatively to one or more of the examples disclosed above, in some examples, the plurality of processing means can include one or more hardware accelerator means configured to process the data stored in the storing means. Additionally or alternatively to one or more of the examples disclosed above, in some examples, the integrated circuit can further comprise communication means for interfacing with another integrated circuit. Additionally or alternatively to one or more of the examples disclosed above, in some examples, the integrated circuit can further comprising means for generating an image of touch for touch sensing means based on one or more parameters associated with the stored data. The parameters can include one or more of a chip identifier, a scan step, a scan type and a receive channel number.

Some examples of the disclosure are directed to a method for processing data from sensing scans in an integrated circuit comprising a plurality of sense channels, a storage device, and a plurality of processing circuits. The method can comprise receiving signals at the plurality of sense channels from the sensing scans, storing first data based on the signals received at the plurality of sense channels in the storage device, and simultaneously processing the data in the storage device by the plurality of processing circuits, the data in the storage device including the first data. At least two of the plurality of processing circuits can simultaneously access the storage device. Additionally or alternatively to one or more of the examples disclosed above, in some examples, the method can further comprise switching a coupling between data storage locations and one or more inputs or one or more outputs of at least one of the plurality of processing circuits. Additionally or alternatively to one or more of the examples disclosed above, in some examples, at least one of the plurality of processing circuits can be a hardware accelerator configured to process the data. Additionally or alternatively to one or more of the examples disclosed above, in some examples, the hardware accelerator can perform operations including one or more of scaling the data, subtracting a baseline amount from the data, adding or subtracting an offset to the data, generating a mapping of pixel locations with signals above a first threshold or below a second threshold, diffusing an image, and converting between a magnitude and phase representation and an in-phase component and quadrature component representation. Additionally or alternatively to one or more of the examples disclosed above, in some examples, the method can further comprise receiving second data from another integrated circuit and storing the second data in the storage device. The data in the storage device processed by the plurality of processing circuits can further include the second data. Additionally or alternatively to one or more of the examples disclosed above, in some examples, the method can further comprise generating an image of touch from the data in the storage device based on one or more parameters associated with the first data or the second data. The parameters can include one or more of a circuit identifier, a scan step, a scan type and a receive channel number. Some examples of the disclosure are directed to a non-transitory computer readable storage medium. The computer readable medium can contain instructions that, when executed by a processor, can perform the method of the examples disclosed above.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An integrated circuit apparatus comprising:
   a touch sensor panel;
   a plurality of touch controller integrated circuits, one or more of the plurality of touch controller integrated circuits comprising:
      a plurality of receive channels configured to receive signals from sensing operations;
      a memory configured to store data based on the signals from the plurality of receive channels;
      a plurality of processing circuits, wherein at least two of the plurality of processing circuits are configured to access the memory using Direct Memory Access, and wherein the plurality of processing circuits includes one or more hardware accelerators configured to process data accessed from the memory; and
      switching circuitry coupled between the memory and at least one of the plurality of processing circuits, wherein the switching circuitry is configured to dynamically couple one or more banks of the memory to one or more inputs or one or more outputs of the one or more of the plurality of processing circuits; and
   a plurality of switching circuits coupled between the plurality of touch controller integrated circuits and the touch sensor panel.

2. The integrated circuit apparatus of claim 1, wherein the one or more hardware accelerators comprises a plurality of hardware accelerators, wherein at least one of the plurality of processing circuits of the one or more of the plurality of touch controller circuits is configured to sequence the processing of the data accessed from the memory by the plurality of hardware accelerators, wherein the one or more of the plurality of touch controller integrated circuits further comprise:
   switching circuitry coupled between the memory and the plurality of hardware accelerators, the switching circuitry is configured to dynamically couple one or more banks of the memory to one or more inputs or one or more outputs of the plurality of hardware accelerators according the sequencing of the processing.

3. The integrated circuit apparatus of claim 1, wherein the memory includes a plurality of access ports for simultaneous direct access of the memory by one or more of the plurality of processing circuits.

4. The integrated circuit apparatus of claim 1, wherein sequencing the processing of the data accessed from the memory of the one or more of the plurality of touch controller integrated circuits includes distributing processing of one or more algorithms between the one or more of the plurality of processing circuits.

5. The integrated circuit apparatus of claim 1, wherein the one or more hardware accelerators include a first hardware accelerator to perform one or more of scaling the data accessed from the memory, subtracting a baseline amount from the data accessed from the memory, and adding or subtracting an offset to the data accessed from the memory.

6. The integrated circuit apparatus of claim 1, wherein the one or more hardware accelerators include a first hardware accelerator to generate a mapping of touch node locations with signals above a first threshold and below a second threshold.

7. The integrated circuit apparatus of claim 1, wherein the one or more hardware accelerators include a first hardware accelerator to perform an image diffusion algorithm.

8. The integrated circuit apparatus of claim 1, wherein the one or more hardware accelerators include a first hardware accelerator configured to convert data represented by a magnitude component and a phase component into data represented by an in-phase component and a quadrature component, or to convert data represented by the in-phase component and the quadrature component into data represented by the magnitude component and the phase component.

9. The integrated circuit apparatus of claim 1, wherein the one or more of the plurality of touch controller integrated circuits further comprise:
an interface with one or more ports for transmitting first touch signals to, or receiving second touch signals from, another of the plurality of touch controller integrated circuits.

10. The integrated circuit apparatus of claim 1, wherein at least one processing circuit of the plurality of processing circuits in each of the plurality of touch controller integrated circuits is configured to generate an image of touch from execution of one or more scans of the touch sensor panel based on one or more parameters associated with the signals or the data, the parameters including one or more of a chip identifier, a scan step, a scan type and a receive channel number.

11. The integrated circuit apparatus of claim 10, wherein the at least one processing circuit of the plurality of processing circuits is configured to map information associated with the signals or the data stored in the memory to physical touch node locations of the touch sensor panel in order to generate the image of touch.

12. The integrated circuit apparatus of claim 1, wherein each touch controller integrated circuit is coupled to two or more of the plurality of switching circuits.

13. The integrated circuit apparatus of claim 1, wherein each of the plurality of touch controller integrated circuits performs a plurality of scan steps and the data stored in the memory based on the received signals are transferred to each of the plurality of touch controller integrated circuits such that each touch controller stores in its respective memory the data from the plurality of touch controller integrated circuits.

14. A method for performing sensing scans and for processing data from the sensing scans for a touch-sensitive device including a plurality of touch controller integrated circuits and a plurality of switching circuits coupled between the plurality of touch controller integrated circuits and a touch sensor panel, one or more of the plurality of integrated circuits comprising a plurality of sense channels, a storage device, and a plurality of processing circuits, the method comprising:
decoding synchronization signals;
configuring the plurality of touch controller integrated circuits for performing the sensing scans based on the decoded synchronization signals;
performing one or more scan steps at each of the plurality of touch controller integrated circuits, wherein performing the one or more scan steps comprises:
receiving signals at the plurality of sense channels of each of the plurality of touch controller integrated circuits from the one or more steps of the sensing scans; and
storing data based on the signals received at the plurality of sense channels in the storage device of each of the plurality of touch controller integrated circuits;
transferring the data based on signals received in response to the one or more scanning steps between the plurality of touch controller integrated circuits; and
processing the data at the one or more of the plurality of touch controller integrated circuits to generate an image of touch from the execution of one or more scans of the touch sensor panel, wherein processing the data comprises simultaneously processing the data in the storage device of the one or more of the plurality of touch controller integrated circuits by the plurality of processing circuits, wherein:
the plurality of processing circuits includes one or more hardware accelerators, and
at least two of the plurality of processing circuits simultaneously access the storage device.

15. The method of claim 14, further comprising:
switching a coupling between data storage locations and one or more inputs or one or more outputs of at least one of the plurality of processing circuits.

16. The method of claim 14, wherein the one or more hardware accelerators perform operations including one or more of scaling the data, subtracting a baseline amount from the data, adding or subtracting an offset to the data, generating a mapping of touch node locations with signals above a first threshold or below a second threshold, diffusing an image, and converting between a magnitude and phase representation and an in-phase component and quadrature component representation.

17. The method of claim 14,
wherein generating the image of touch is based on parameters associated with the data from each of the plurality of touch controller integrated circuits, the parameters including a circuit identifier, a scan step, a scan type and a receive channel number.

18. The method of claim 14, further comprising:
generating signals for reprogramming the plurality of switching circuits based on the decoded synchronization signals and a scan plan.

19. The method of claim 14, further comprising:
generating signals for reprogramming or adjusting a coupling of one or more of the plurality of switching circuits based on the decoded synchronization signals and output from processing touch data of one or more scans.

20. The method of claim 14, wherein transferring the data based on signals received in response to the one or more scanning steps comprises:
transferring a first portion of the data between a first touch controller integrated circuit and a second touch controller integrated circuit; and
transferring a second portion of the data between the first touch controller integrated circuit and the second touch controller integrated circuit, and simultaneously transferring the first portion of the data from the first scanning step between the second touch controller integrated circuit and a third touch controller integrated circuit.

21. A non-transitory computer readable storage medium having stored thereon instructions, which when executed by a processor, perform a method for performing sensing scans and for processing data from the sensing scans for a touch-sensitive device including a plurality of touch controller integrated circuits and a plurality of switching circuits coupled between the plurality of touch controller integrated circuits and a touch sensor panel, one or more of the plurality of integrated circuits comprising a plurality of sense channels, a storage device, and a plurality of processing circuits, the method comprising:
  decoding synchronization signals;
  configuring the plurality of touch controller integrated circuits for performing the sensing scans based on the decoded synchronization signals;
  performing one or more scan steps at each of the plurality of touch controller integrated circuits, wherein performing the one or more scan steps comprises:
    receiving signals at the plurality of sense channels of each of the plurality of touch controller integrated circuits from the one or more steps of the sensing scans; and
    storing data based on the signals received at the plurality of sense channels in the storage device of each of the plurality of touch controller integrated circuits;
  transferring the data based on signals received in response to the one or more scanning steps between the plurality of touch controller integrated circuits; and
  processing the data at the one or more of the plurality of touch controller integrated circuits to generate an image of touch from the execution of one or more scans of the touch sensor panel, wherein processing the data comprises simultaneously processing the data in the storage device of the one or more of the plurality of touch controller integrated circuits by the plurality of processing circuits, wherein:
    the plurality of processing circuits includes one or more hardware accelerators, and
    at least two of the plurality of processing circuits simultaneously access the storage device.

22. The non-transitory computer readable storage medium of claim 21, further comprising:
  switching a coupling between data storage locations and one or more inputs or one or more outputs of at least one of the plurality of processing circuits.

23. The non-transitory computer readable storage medium of claim 21,
  wherein generating the image of touch is based on parameters associated with the first data or the second data, the parameters including a circuit identifier, a scan step, a scan type and a receive channel number.

24. The non-transitory computer readable storage medium of claim 21, wherein the one or more hardware accelerators perform operations including one or more of scaling the data, subtracting a baseline amount from the data, adding or subtracting an offset to the data, generating a mapping of touch node locations with signals above a first threshold or below a second threshold, diffusing an image, and converting between a magnitude and phase representation and an in-phase component and quadrature component representation.

* * * * *